(12) United States Patent
Nakakura

(10) Patent No.: US 9,309,938 B2
(45) Date of Patent: Apr. 12, 2016

(54) BICYCLE BRAKE CALIPER ASSEMBLY

(71) Applicant: SHIMANO INC., Sakai (JP)

(72) Inventor: Masahiro Nakakura, Sakai (JP)

(73) Assignee: SHIMANO INC., Sakai (JP)

( * ) Notice: Subject to any disclaimer, the term of this patent is extended or adjusted under 35 U.S.C. 154(b) by 0 days.

(21) Appl. No.: 14/260,232

(22) Filed: Apr. 23, 2014

(65) Prior Publication Data

US 2015/0308524 A1 Oct. 29, 2015

(51) Int. Cl.
*F16D 55/00* (2006.01)
*F16D 65/00* (2006.01)
*B62L 1/00* (2006.01)

(52) U.S. Cl.
CPC .............. *F16D 65/0068* (2013.01); *B62L 1/00* (2013.01); *F16D 55/00* (2013.01); *F16D 2055/0016* (2013.01)

(58) Field of Classification Search
CPC .......... B62L 1/005; B62L 3/023; B62L 1/00; F16D 65/0068
USPC ................. 188/71.1, 73.31, 24.12, 26, 24.22, 188/24.11, 344
See application file for complete search history.

(56) References Cited

U.S. PATENT DOCUMENTS

| | | | | |
|---|---|---|---|---|
| 6,148,964 A * | 11/2000 | Huang | ............. | 188/26 |
| 6,206,144 B1 * | 3/2001 | Di Bella | ............ | 188/26 |
| 6,230,849 B1 * | 5/2001 | Lumpkin | ............ | 188/24.12 |
| 6,336,526 B1 * | 1/2002 | Chou | ............. | 188/26 |
| 6,745,874 B1 * | 6/2004 | Huang | ............. | 188/26 |
| 6,945,369 B1 * | 9/2005 | Chen | ............. | 188/26 |
| 7,007,776 B1 * | 3/2006 | Lin | ............. | 188/24.22 |
| 7,478,707 B2 * | 1/2009 | Choon Chye et al. | ......... | 188/26 |
| 2004/0188186 A1 * | 9/2004 | Chen | ............. | 188/26 |
| 2013/0048444 A1 * | 2/2013 | Hirotomi et al. | ........... | 188/73.31 |
| 2013/0133991 A1 * | 5/2013 | Thomas | ............. | 188/73.31 |
| 2015/0001014 A1 * | 1/2015 | Noborio et al. | ............ | 188/73.31 |

* cited by examiner

*Primary Examiner* — Thomas J Williams
*Assistant Examiner* — Mariano Sy
(74) *Attorney, Agent, or Firm* — Mori & Ward, LLP

(57) ABSTRACT

A bicycle brake caliper assembly comprises a brake caliper and a base structure. The brake caliper is configured to apply a braking force on a brake disc rotor configured to be rotatable about a rotational axis. The brake caliper has an attachment surface. The base structure has a first base surface. The base structure is configured to be coupled to the attachment surface of the brake caliper and to be attached to a bicycle frame so as to arrange the brake caliper at one of a first position and a second position which is farther from the rotational axis than the first position. The base structure is configured such that a relative angle defined between the attachment surface of the brake caliper and the first base surface of the base structure differs between the first position and the second position.

11 Claims, 19 Drawing Sheets

(COMPARATIVE EXAMPLE)

(COMPARATIVE EXAMPLE)

BICYCLE BRAKE CALIPER ASSEMBLY

BACKGROUND OF THE INVENTION

1. Field of the Invention

The present invention relates to a bicycle brake caliper assembly.

2. Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is a bicycle brake device. In particular, in recent years, bicycles have been provided with disc braking devices.

SUMMARY OF THE INVENTION

In accordance with a first aspect of the present invention, a bicycle brake caliper assembly comprises a brake caliper and a base structure. The brake caliper is configured to apply a braking force on a brake disc rotor configured to be rotatable about a rotational axis. The brake caliper has an attachment surface. The base structure has a first base surface. The base structure is configured to be coupled to the attachment surface of the brake caliper and to be attached to a bicycle frame so as to arrange the brake caliper at one of a first position and a second position which is farther from the rotational axis than the first position. The base structure is configured such that a relative angle defined between the attachment surface of the brake caliper and the first base surface of the base structure differs between the first position and the second position.

In accordance with a second aspect of the present invention, the bicycle brake caliper assembly according to the first aspect is configured so that the base structure includes a base member configured to be attached to the bicycle frame with one of a first orientation which is to arrange the brake caliper at the first position, and a second orientation which is to arrange the brake caliper at the second position.

In accordance with a third aspect of the present invention, the bicycle brake caliper assembly according to the second aspect is configured so that the base member has the first base surface and a second base surface configured to face the attachment surface on the brake caliper. The second base surface is inclined with respect to the first base surface.

In accordance with a fourth aspect of the present invention, the bicycle brake caliper assembly according to the third aspect is configured so that the second base surface is inclined with respect to the first base surface at an inclination angle between 1 degree and 3 degrees.

In accordance with a fifth aspect of the present invention, the bicycle brake caliper assembly according to the fourth aspect is configured so that the inclination angle is equal to 2 degrees.

In accordance with a sixth aspect of the present invention, the bicycle brake caliper assembly according to the first aspect is configured so that the base structure includes a base member and at least one spacer member. The base member is configured to be coupled to the brake caliper. The at least one spacer member is configured to be disposed in at least one of a first space between the brake caliper and the base member, and a second space between the base member and the bicycle frame.

In accordance with a seventh aspect of the present invention, the bicycle brake caliper assembly according to the sixth aspect is configured so that the base member has the first base surface and a second base surface configured to face the attachment surface on the brake caliper, and the second base surface is parallel to the first base surface.

In accordance with an eighth aspect of the present invention, the bicycle brake caliper assembly according to the seventh aspect is configured so that the spacer member includes a first element having a first spherical surface, and a second element having a second spherical surface contactable with the first spherical surface.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
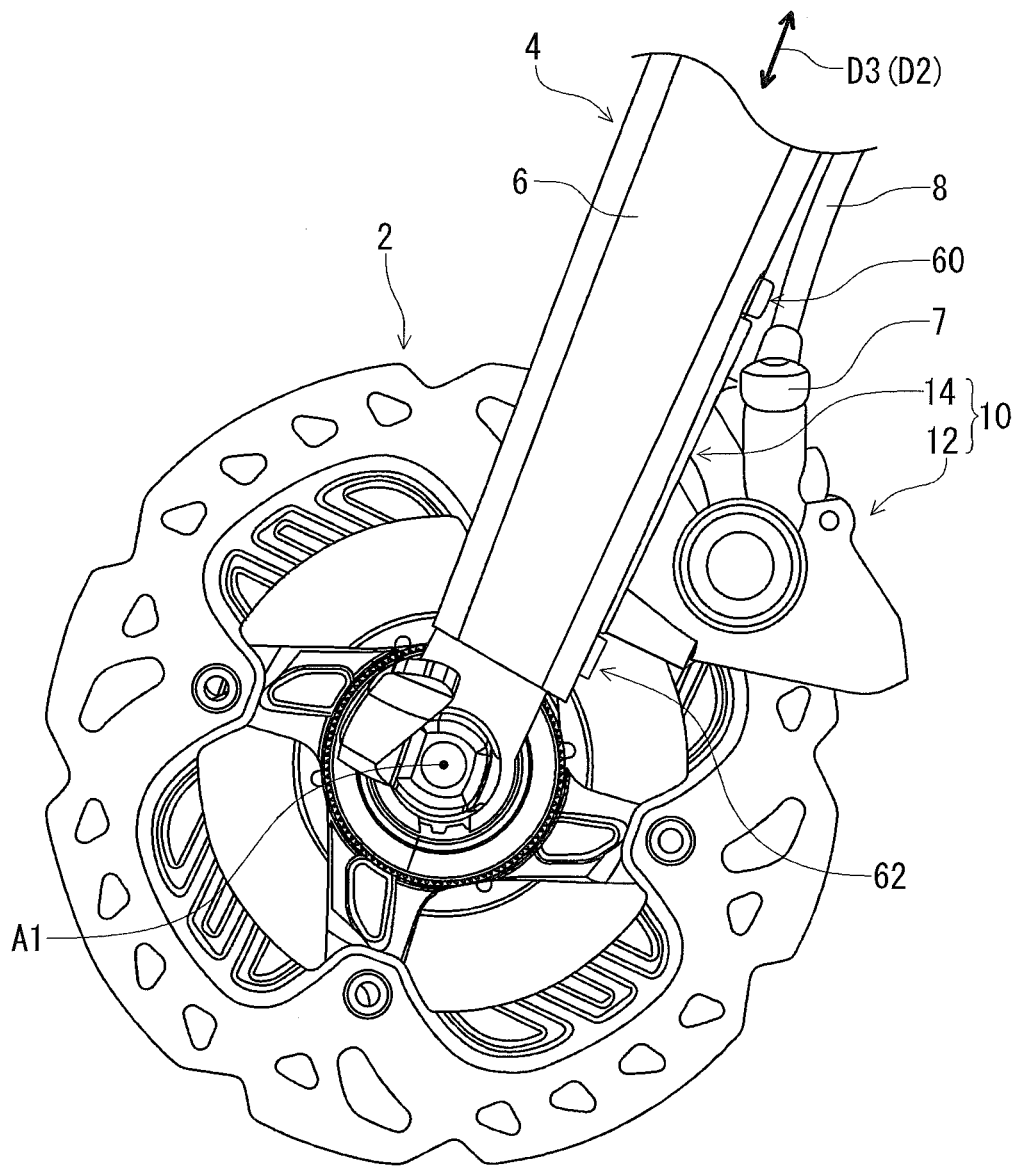
FIG. 1 is a left side elevational view of a front portion of a bicycle with a bicycle brake caliper assembly in accordance with a first embodiment.

The embodiments will now be described with reference to the accompanying drawings, wherein like reference numerals designate corresponding or identical elements throughout the various drawings.

First Embodiment

FIG. 1 illustrates a bicycle brake caliper assembly 10 in accordance with a first embodiment. In the illustrated embodiment, the bicycle brake caliper assembly 10 is applied to a front disc brake system. The bicycle brake caliper assembly 10 can, however, be applied to a rear disc brake system.

In the present application, the following directional terms "front", "rear", "forward", "rearward", "left", "right", "transverse", "upward" and "downward" as well as any other similar directional terms refer to those directions which are determined on the basis of a user (e.g., a rider) who sits on a saddle (not shown) of a bicycle with facing a handlebar (not shown). Accordingly, these terms, as utilized to describe the bicycle brake caliper assembly 10, should be interpreted relative to the bicycle equipped with the bicycle brake caliper assembly 10 as used in an upright riding position on a horizontal surface.

As seen in FIG. 1, the bicycle brake caliper assembly 10 comprises a brake caliper 12 and a base structure 14. The brake caliper 12 is configured to apply a braking force on a brake disc rotor 2 configured to be rotatable about a rotational axis A1. In the illustrated embodiment, the bicycle brake caliper assembly 10 is attached to a bicycle frame 4. More specifically, the bicycle brake caliper assembly 10 is attached to a front fork 6 of the bicycle frame 4. In a case where the bicycle brake caliper assembly 10 is applied to the rear disc brake system, for example, the bicycle brake caliper assembly 10 is attached to a chain stay (not shown) of the bicycle frame 4.

The brake caliper 12 is fluidly connected to a bicycle hydraulic operating device (not shown) via a banjo 7 and a hydraulic hose 8. Any kind of suitable manner can be applied to connection between the brake caliper 12 and the hydraulic hose 8 if needed and/or desired. Since the bicycle hydraulic operating device is well known in the bicycle field, it will not be described and/or illustrated in detail here for the sake of brevity.

Figure 2:
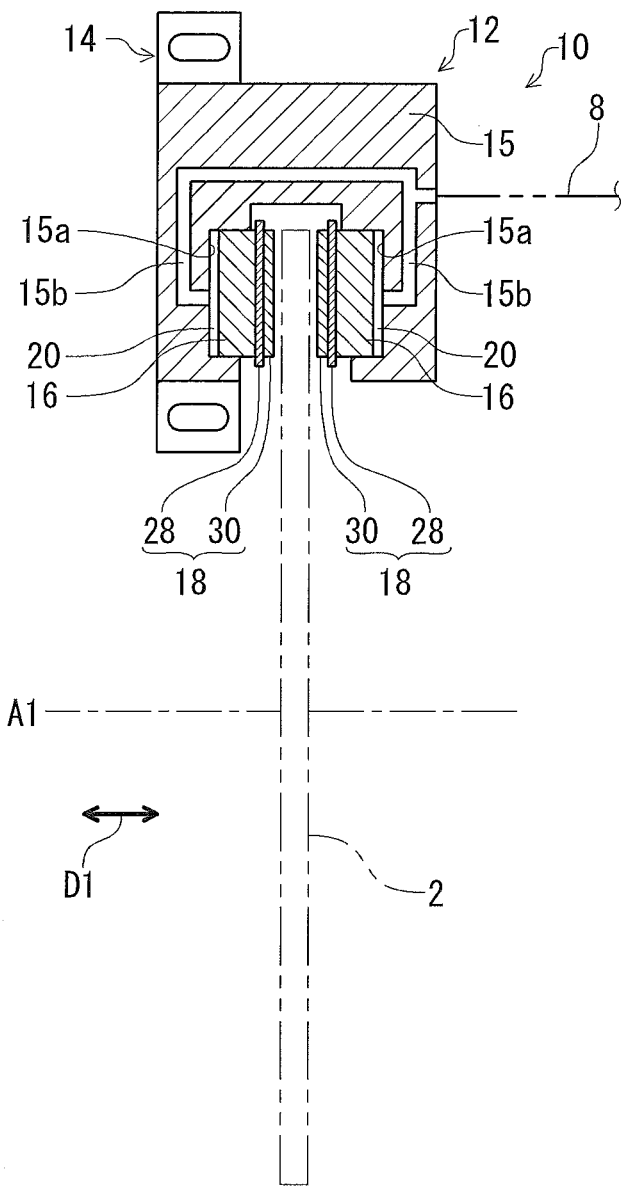
FIG. 2 is a schematic structural diagram of a brake caliper of the bicycle brake caliper assembly illustrated in FIG. 1.

As seen in FIG. 2, the brake caliper 12 includes a housing 15, a pair of pistons 16, and a pair of brake pads 18. The pistons 16 are arranged to press the brake pads 18 toward the brake disc rotor 2. The housing 15 includes cylinders 15a and a caliper fluid passage 15b. The pistons 16 are disposed within the cylinders 15a to be movable in an axial direction D1 of the brake disc rotor 2. Fluid chambers 20 are defined by the pistons 16 and the cylinders 15a. The fluid chambers 20 are in fluid communication with the caliper fluid passage 15b. The caliper fluid passage 15b is in fluid communication with a master cylinder (not shown) of the bicycle hydraulic operating device via the hydraulic hose 8.

Figure 3:
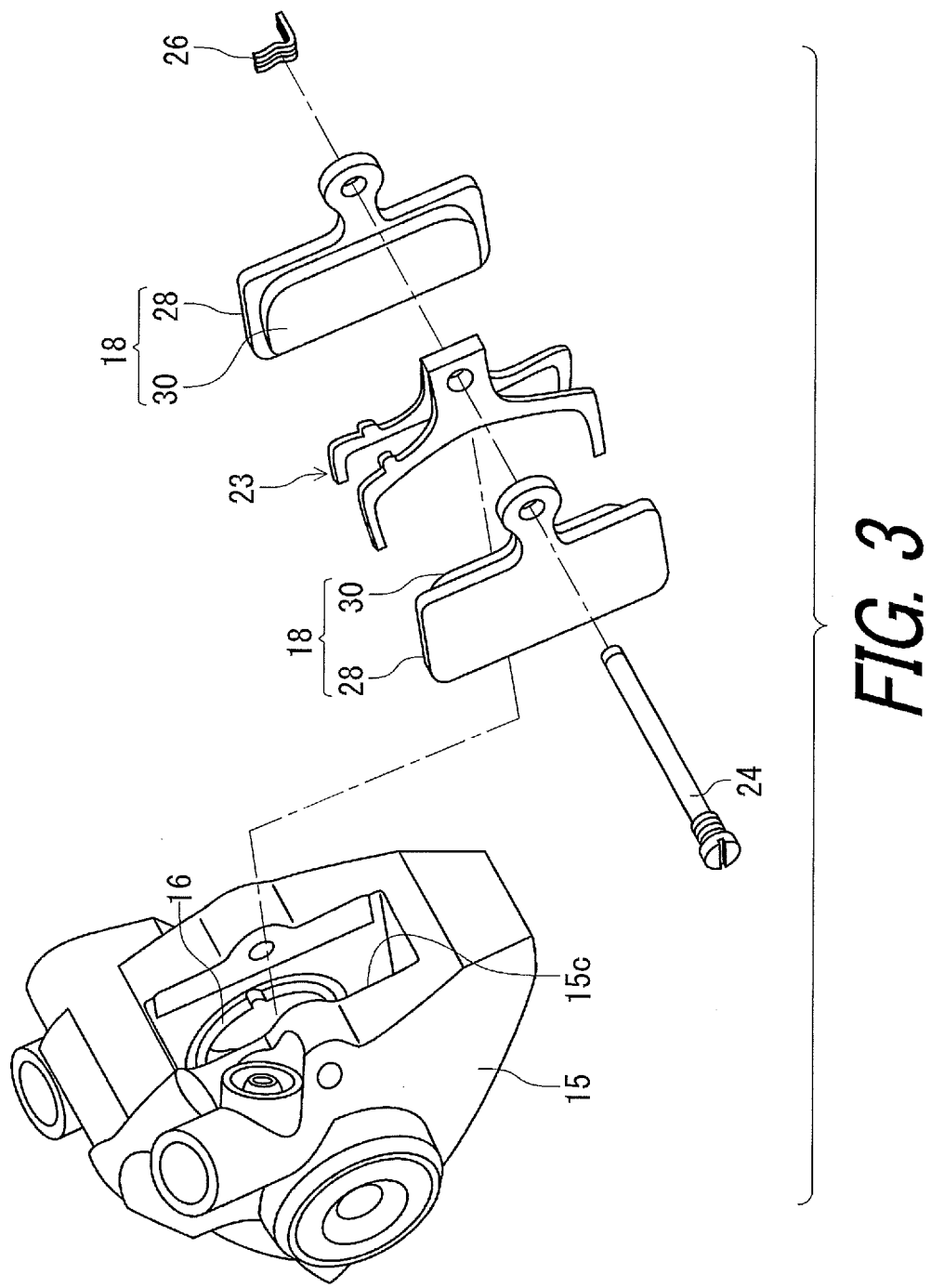
FIG. 3 is an exploded perspective view of the brake caliper of the bicycle brake caliper assembly illustrated in FIG. 1.

As seen in FIG. 3, the brake caliper 12 includes a pad spring 23 configured to bias the brake pads 18 toward the pistons 16 (FIG. 2). The brake pads 18 and the pad spring 23 are movably mounted to the housing 15 using a pad axle 24 and a snap ring 26. The housing 15 includes a through-opening 15c in which the brake pads 18 are movably disposed. Each of the brake pads 18 includes a plate body 28 and a friction part 30. The friction part 30 is secured to the plate body 28. Each of the friction parts 30 slidably contact the brake disc rotor 2 when the brake pads 18 are pressed against the brake disc rotor 2 by the pistons 16 (FIG. 2).

Figure 4:
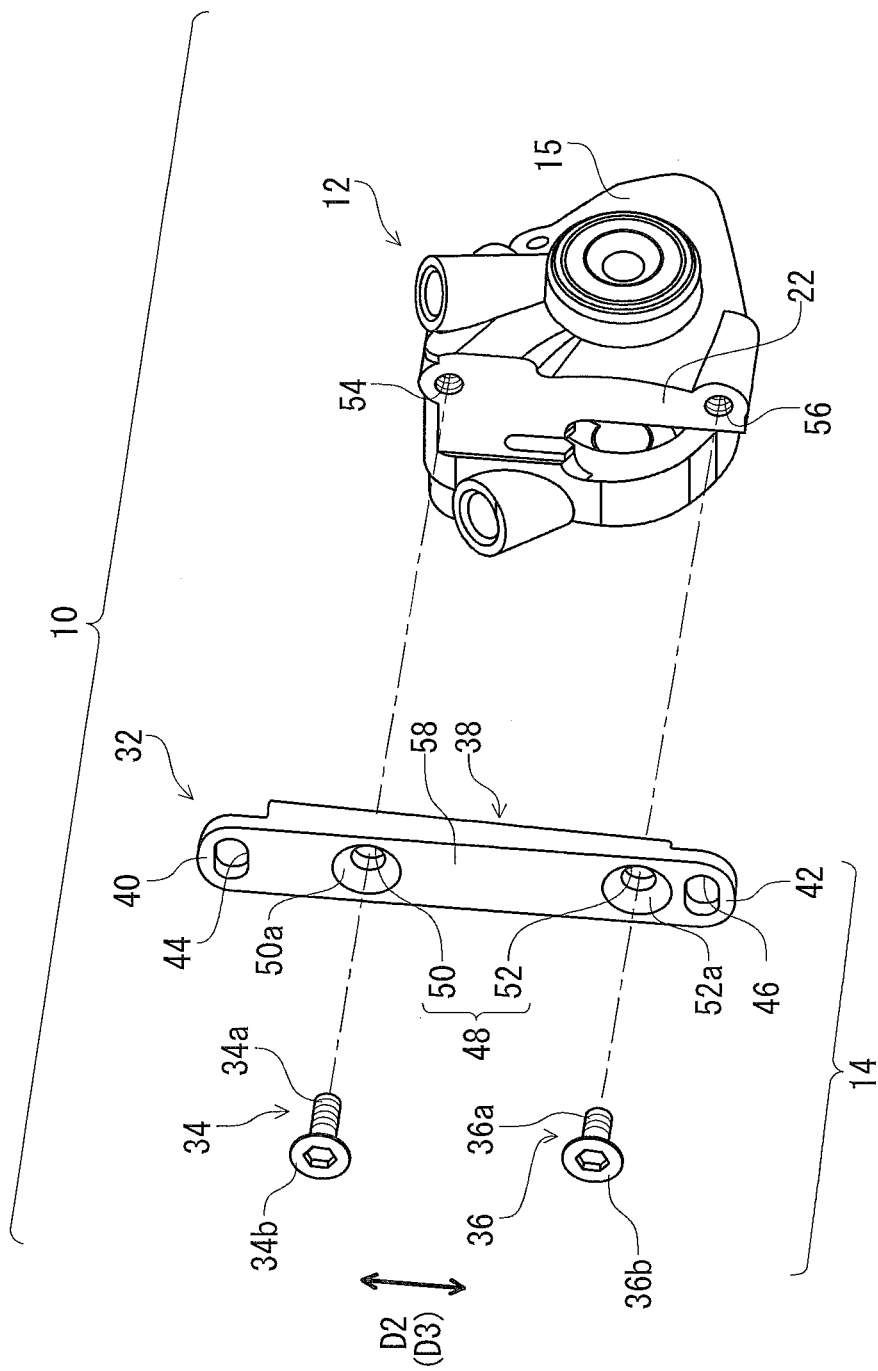
FIG. 4 is an exploded perspective view of the bicycle brake caliper assembly illustrated in FIG. 1 (first position)

As seen in FIG. 4, the base structure 14 includes a base member 32, a first coupling member 34, and a second coupling member 36. The base member 32 extends in a longitudinal direction D2. The base member 32 is configured to be coupled to the brake caliper 12 by the first coupling member 34 and the second coupling member 36. More specifically, the brake caliper 12 has an attachment surface 22. The base member 32 is configured to be coupled to the attachment surface 22 of the brake caliper 12 by the first coupling member 34 and the second coupling member 36.

The base member 32 includes a main body 38, a first end portion 40, and a second end portion 42. In the first embodiment, the main body 38, the first end portion 40, and the second end portion 42 are integrally provided as a single unitary member. The main body 38 has a plate shape and extends in the longitudinal direction D2. The first end portion 40 is opposite to the second end portion 42 with respect to the main body 38. The first end portion 40 is disposed at one end of the main body 38. The second end portion 42 is disposed at the other end of the main body 38. The base member 32 includes a first attaching through-hole 44 and a second attaching through-hole 46. The first attaching through-hole 44 is provided at the first end portion 40. The second attaching through-hole 46 is provided at the second end portion 42.

The base member 32 includes a coupling portion 48 at which the brake caliper 12 is coupled. The coupling portion 48 includes a first through-hole 50 and a second through-hole 52. The first through-hole 50 and the second through-hole 52 are provided on the main body 38. The second through-hole 52 is spaced apart from the first through-hole 50 in the longitudinal direction D2. The second through-hole 52 is arranged apart from the first through-hole 50 in a radial direction D3 of the brake disc rotor 2 (FIG. 1) in a state where the base member 32 is attached to the bicycle frame 4 (FIG. 1).

As seen in FIG. 4, the first coupling member 34 is configured to couple the brake caliper 12 to the base member 32. The second coupling member 36 is configured to couple the brake caliper 12 to the base member 32. The first coupling member 34 extends through the first through-hole 50 and the second coupling member 36 extends through the second through-hole 52 in a state where the base member 32 is coupled to the brake caliper 12 by the first coupling member 34 and the second coupling member 36.

The first coupling member 34 is a countersunk head bolt and includes a first external thread 34a and a first countersunk head 34b. The second coupling member 36 is a countersunk head bolt and includes a second external thread 36a and a second countersunk head 36b. In the illustrated embodiment, the second coupling member 36 has a length shorter than a length of the first coupling member 34 while the second coupling member 36 has substantially the same shape as that of the first coupling member 34.

As seen in FIG. 4, the brake caliper 12 includes a first threaded hole 54 and a second threaded hole 56. The first threaded hole 54 and the second threaded hole 56 are provided on the attachment surface 22. The first coupling member 34 is screwed in the first threaded hole 54 and the second coupling member 36 is screwed in the second threaded hole 56 in a state where the base member 32 is coupled to the brake caliper 12.

The base structure 14 has a first base surface 58. More specifically, the base member 32 has the first base surface 58.

The first base surface 58 faces opposite to the brake caliper 12 in a state where the base member 32 is coupled to the brake caliper 12. The first through-hole 50 includes a first tapered surface 50a provided on the first base surface 58. The second through-hole 52 includes a second tapered surface 52a provided on the first base surface 58.

In a state where the base member 32 is coupled to the brake caliper 12 with the first coupling member 34, the first countersunk head 34b of the first coupling member 34 contacts the first tapered surface 50a of the first through-hole 50 and is disposed within a space defined by the first tapered surface 50a. Thus, the first countersunk head 34b is prevented from protruding beyond the first base surface 58 toward the front fork 6. In a state where the base member 32 is coupled to the brake caliper 12 with the second coupling member 36, the second countersunk head 36b of the second coupling member 36 contacts the second tapered surface 52a of the second through-hole 52 and is disposed within a space defined by the second tapered surface 52a. Thus, the second countersunk head 36b is prevented from protruding beyond the first base surface 58 toward the front fork 6.

Figure 5:
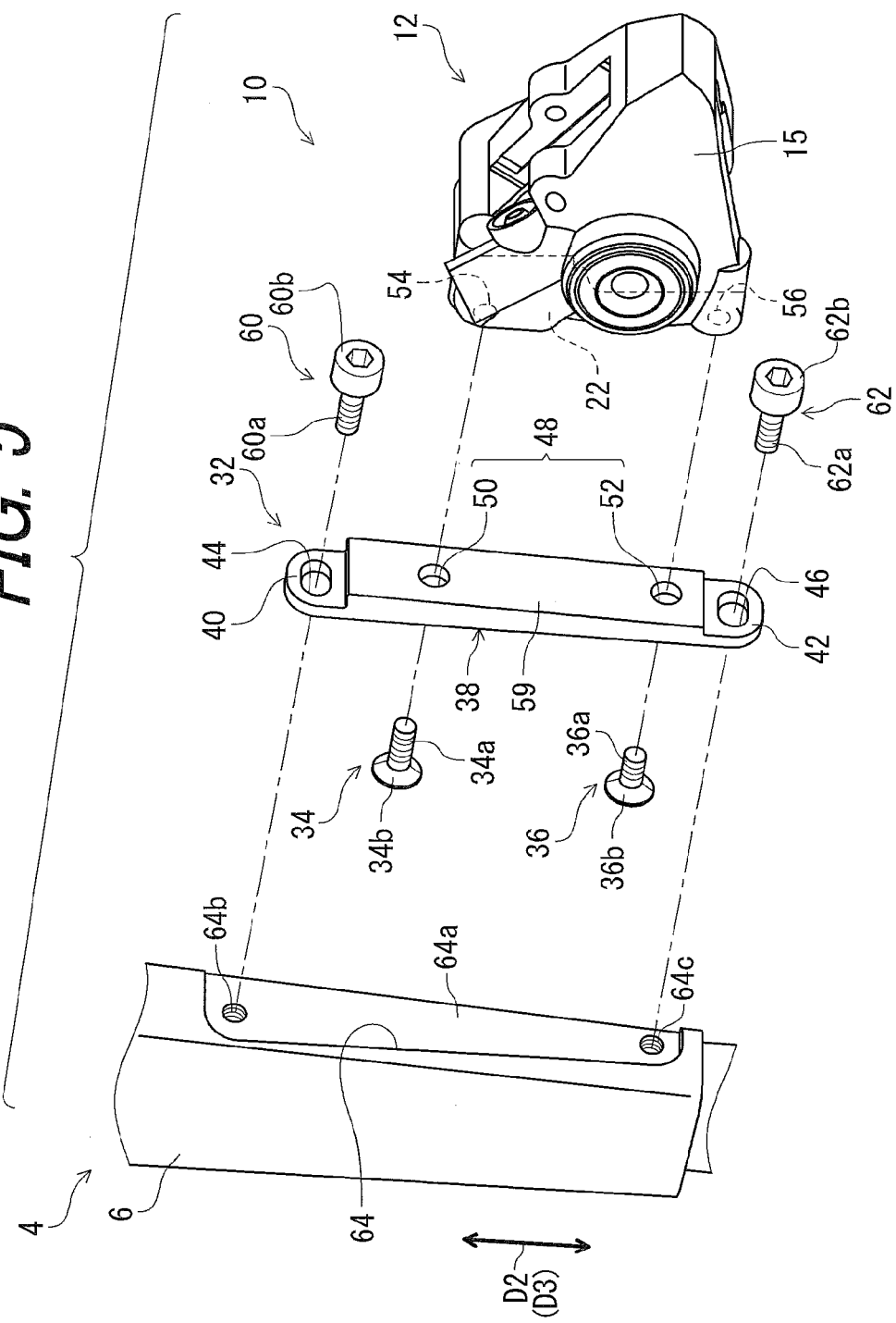
FIG. 5 is an exploded perspective view of the bicycle brake caliper assembly illustrated in FIG. 1 (first position)

As seen in FIG. 5, the base member 32 has a second base surface 59 configured to face the attachment surface 22 on the brake caliper 12. The second base surface 59 contacts the attachment surface 22 in a state where the base member 32 is coupled to the brake caliper 12.

The base member 32 is configured to be attached to the bicycle frame 4 by a first attaching member 60 and a second attaching member 62. In a state where the base member 32 is coupled to the brake caliper 12 with the first coupling member 34 and the second coupling member 36, the base member 32 is attached to the bicycle frame 4 by the first attaching member 60 and the second attaching member 62. In the illustrated embodiment, the base member 32 is attached to an attachment portion 64 of the front fork 6 with the first attaching member 60 and the second attaching member 62.

As seen in FIG. 5, the attachment portion 64 of the front fork 6 is recessed and includes a support surface 64a and threaded holes 64b and 64c. The support surface 64a is configured to face the base member 32. The threaded holes 64b and 64c are provided on the support surface 64a. The base member 32 is disposed within the attachment portion 64 in a state where the base member 32 is attached to the front fork 6 with the first attaching member 60 and the second attaching member 62.

The first attaching member 60 is a hexagon socket head bolt and includes a first external thread 60a and a first hexagon socket head 60b. In FIG. 5, the first external thread 60a is screwed in the threaded hole 64b through the first attaching through-hole 44, and the first end portion 40 of the base member 32 is secured to the attachment portion 64 of the front fork 6 with the first attaching member 60.

The second attaching member 62 is a hexagon socket head bolt and includes a second external thread 62a and a second hexagon socket head 62b. In FIG. 5, the second external thread 62a is screwed in the threaded hole 64c through the second attaching through-hole 46, and the second end portion 42 of the base member 32 is secured to the attachment portion 64 of the front fork 6 with the second attaching member 62.

Figure 6:
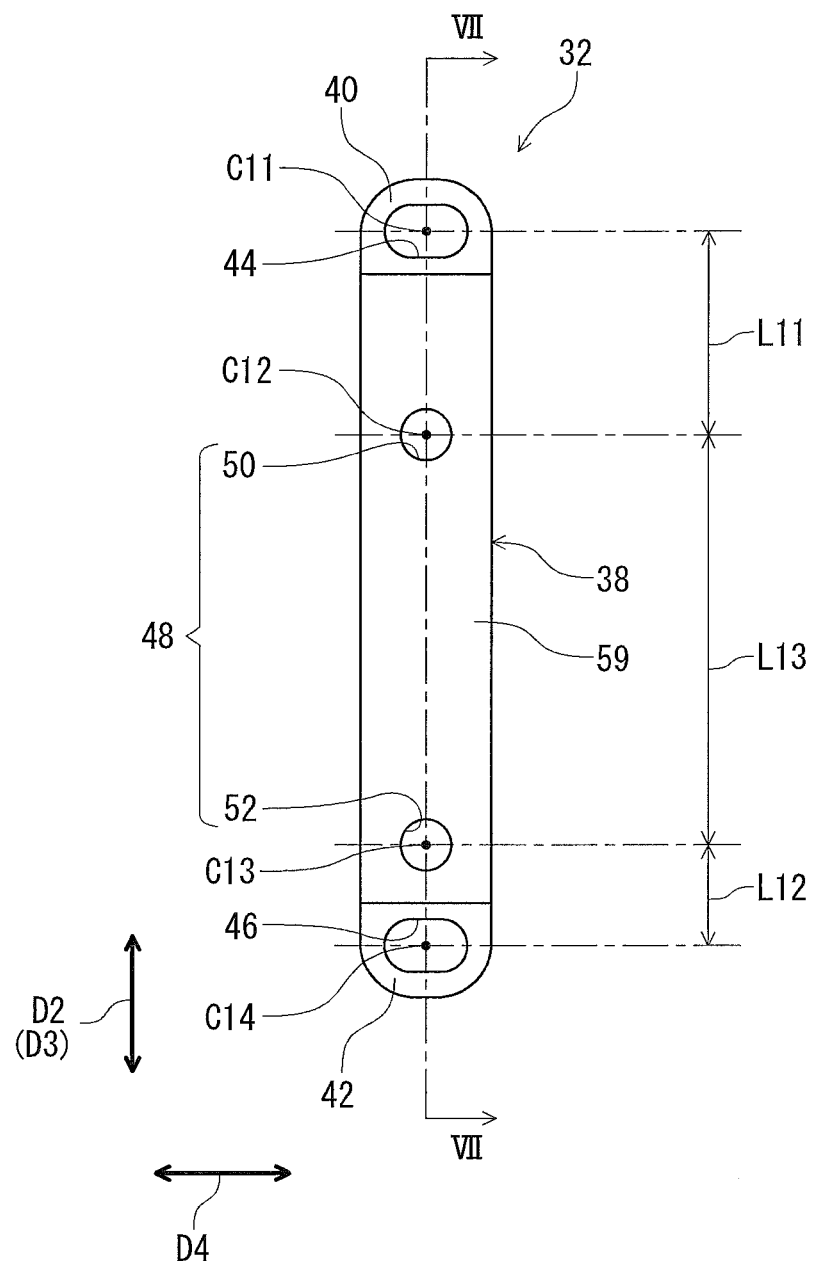
FIG. 6 is a front view of a base member provided in the bicycle brake caliper assembly illustrated in FIG. 1.

As seen in FIG. 6, the first attaching through-hole 44 and the second attaching through-hole 46 extend in a transverse direction D4 of the base member 32. The transverse direction D4 is perpendicular to the longitudinal direction D2 of the base member 32 and is defined along the first base surface 58 (FIG. 4).

A distance L11 between a center C11 of the first attaching through-hole 44 and a center C12 of the first through-hole 50 is different from a distance L12 between a center C14 of the second attaching through-hole 46 and a center C13 of the second through-hole 52. More specifically, the distance L11 between the center C11 of the first attaching through-hole 44 and the center C12 of the first through-hole 50 is longer than the distance L12 between the center C14 of the second attaching through-hole 46 and the center C13 of the second through-hole 52. The distances L11 and L12 are shorter than a distance L13 between the center C12 of the first through-hole 50 and the center C13 of the second through-hole 52. Namely, the base member 32 has an asymmetrical shape in the longitudinal direction D2. Since the distance L11 is different from the distance L12, turning upside down the base member 32 can change a position of the coupling portion 48 in the longitudinal direction D2.

Figure 7:
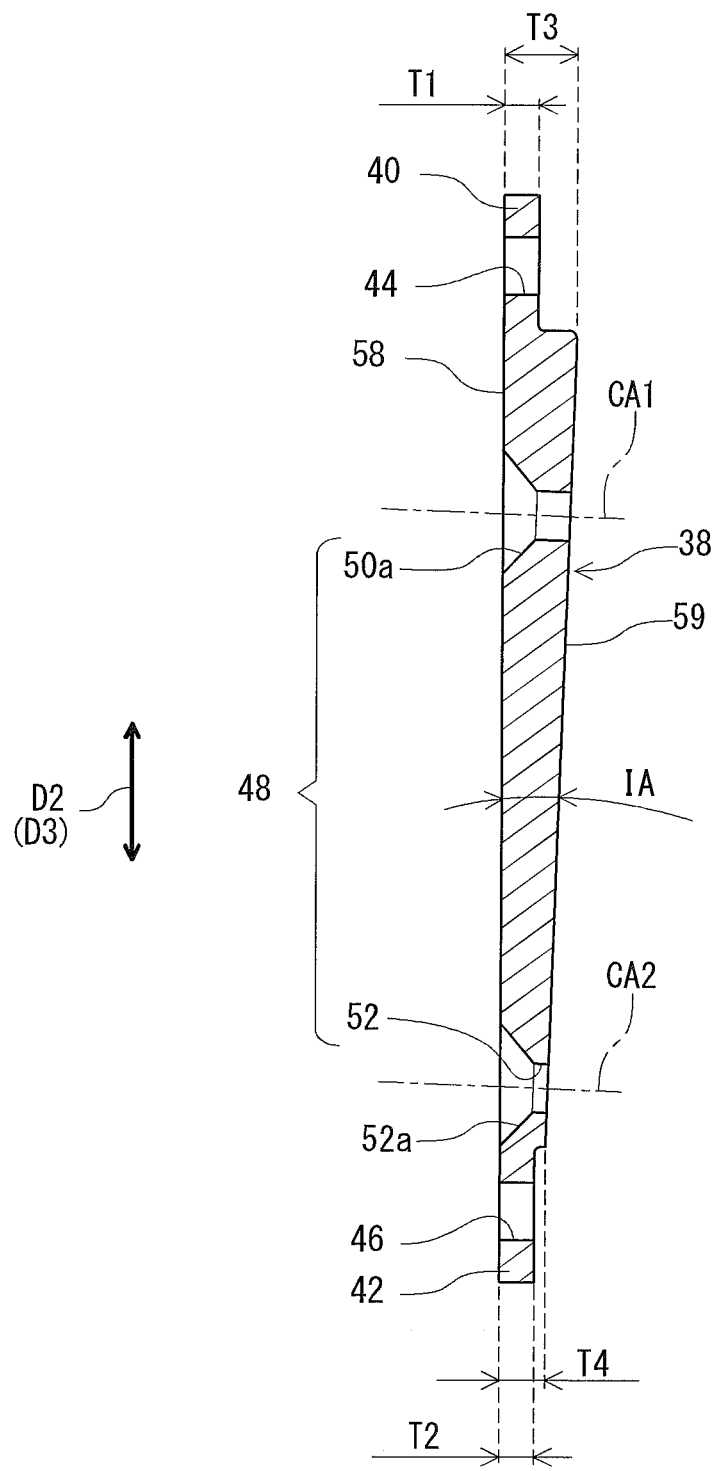
FIG. 7 is a cross sectional view of the base member taken along line VII-VII of FIG. 6.

As seen in FIG. 7, the second base surface 59 is inclined with respect to the first base surface 58. For example, the second base surface 59 is inclined with respect to the first base surface 58 at an inclination angle IA between approximately 1 degree and approximately 3 degrees. In the illustrated embodiment, the base member 32 is configured to set the inclination angle to 2 degrees. In other words, the base member 32 is configured such that the inclination angle IA is equal to 2 degrees.

The first through-hole 50 has a length greater than a length of the second through-hole 52. The first through-hole 50 has a first center axis CA1. The second through-hole 52 has a second center axis CA2. In the illustrated embodiment, the first center axis CA1 and the second center axis CA2 are perpendicular to the second base surface 59.

As seen in FIG. 7, a thickness T1 of the first end portion 40 is substantially the same as a thickness T2 of the second end portion 42. The main body 38 has a maximum thickness T3 and a minimum thickness T4. The maximum thickness T3 of the main body 38 is greater than thicknesses T1 and T2 of the first end portion 40 and the second end portion 42. The minimum thickness T4 of the main body 38 is greater than thicknesses T1 and T2 of the first end portion 40 and the second end portion 42. The maximum thickness T3 is greater than the minimum thickness T4.

Figure 8:
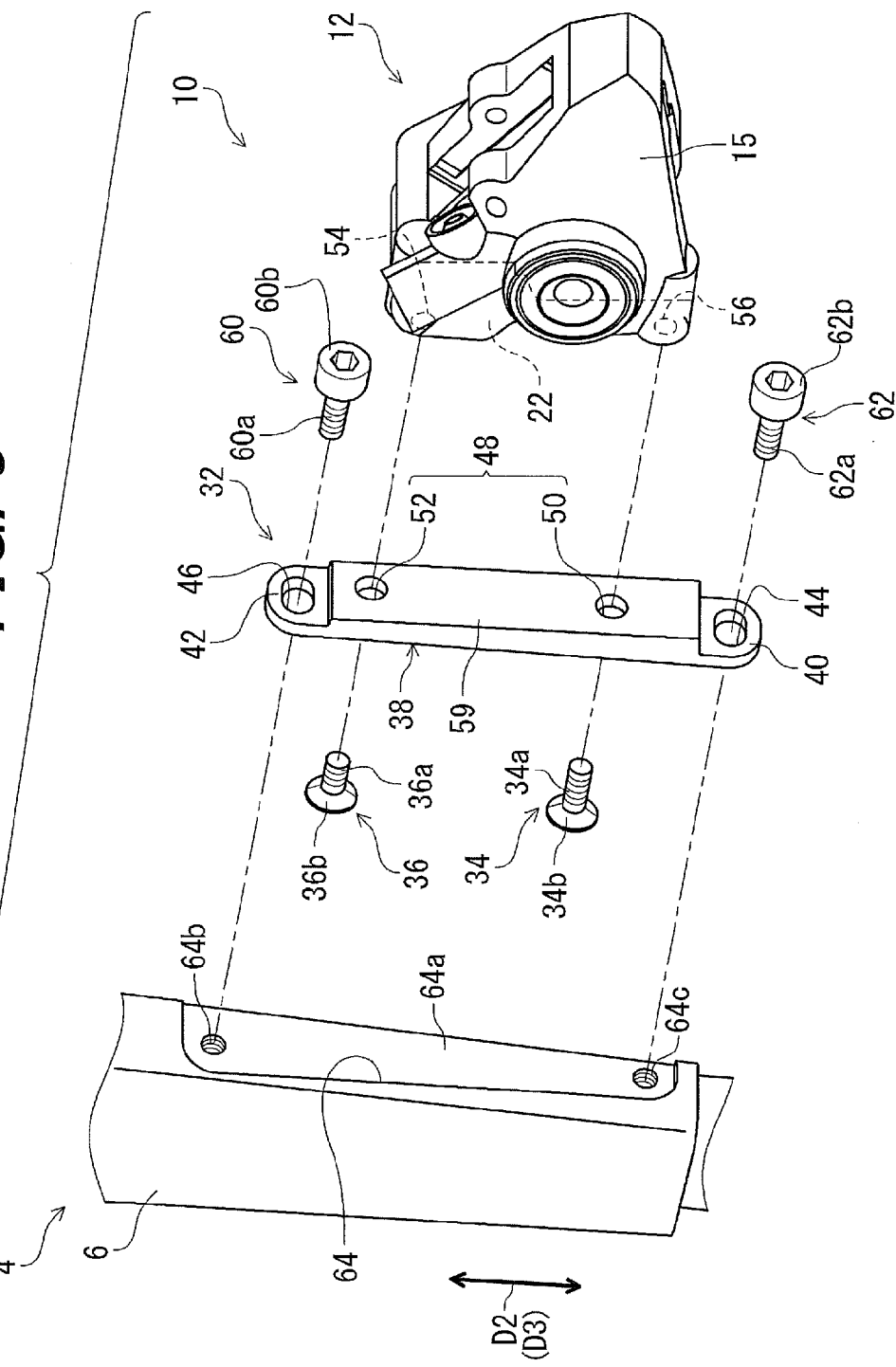
FIG. 8 is an exploded perspective view of the bicycle brake caliper assembly illustrated in FIG. 1 (second position)

As seen in FIGS. 5 and 8, the base member 32 is attached to the bicycle frame 4 with one of a first orientation and a second orientation. FIG. 5 illustrates the base member 32 that is disposed to be attached to the front fork 6 with the first orientation. FIG. 8 illustrates the base member 32 that is disposed to be attached to the front fork 6 with the second orientation.

As seen in FIG. 5, the first end portion 40 is disposed at an upper position and the second end portion 42 is disposed at a lower position in a state where the base member 32 is attached to the front fork 6 with the first orientation. As seen in FIG. 8, the second end portion 42 is disposed at an upper position and the first end portion 40 is disposed at a lower position in a state where the base member 32 is attached to the front fork 6 with the second orientation. Namely, the base member 32 disposed with the second orientation is upside-down in the radial direction D3 of the brake disc rotor 2 (FIG. 1) with respect to the base member 32 disposed with the first orientation.

As seen in FIG. 5, the first external thread 34a of the first coupling member 34 is screwed in the first threaded hole 54 through the first through-hole 50 and the second external thread 36a of the second coupling member 36 is screwed in the second threaded hole 56 through the second through-hole 52 in a state where the base member 32 is attached to the bicycle frame 4 with the first orientation.

In this state, the first attaching member 60 extends through the first attaching through-hole 44 to attach the base member 32 to the bicycle frame 4. The second attaching member 62 extends through the second attaching through-hole 46 to attach the base member 32 to the bicycle frame 4. The first end portion 40 of the base member 32 is secured to the attachment portion 64 of the front fork 6 with the first attaching member 60 and the threaded hole 64b. The second end portion 42 of the base member 32 is secured to the attachment portion 64 of the front fork 6 with the second attaching member 62 and the threaded hole 64c.

As seen in FIG. 8, the first external thread 34a is screwed in the second threaded hole 56 through the first through-hole 50 and the second external thread 36a is screwed in the first threaded hole 54 through the second through-hole 52 in a state where the base member 32 is attached to the bicycle frame 4 with the second orientation.

In this state, the first attaching member 60 extends through the second attaching through-hole 46 to attach the base member 32 to the bicycle frame 4. The second attaching member 62 extends through the first attaching through-hole 44 to attach the base member 32 to the bicycle frame 4. The second end portion 42 of the base member 32 is secured to the attachment portion 64 of the front fork 6 with the first attaching member 60 and the threaded hole 64b. The first end portion 40 of the base member 32 is secured to the attachment portion 64 of the front fork 6 with the second attaching member 62 and the threaded hole 64c.

Figure 9:
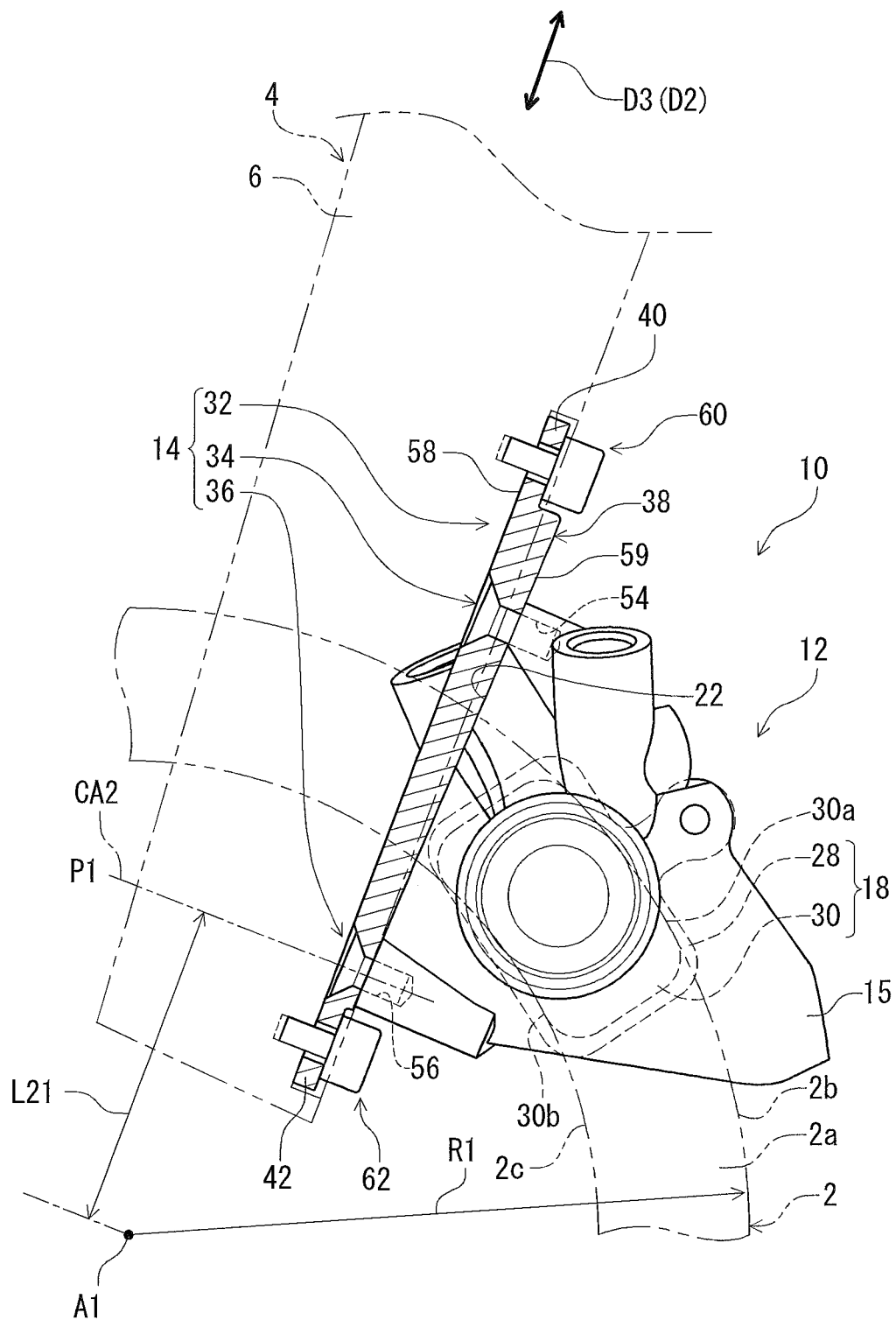
FIG. 9 is an elevational view of the bicycle brake caliper assembly illustrated in FIG. 5 (first position)
Figure 10:
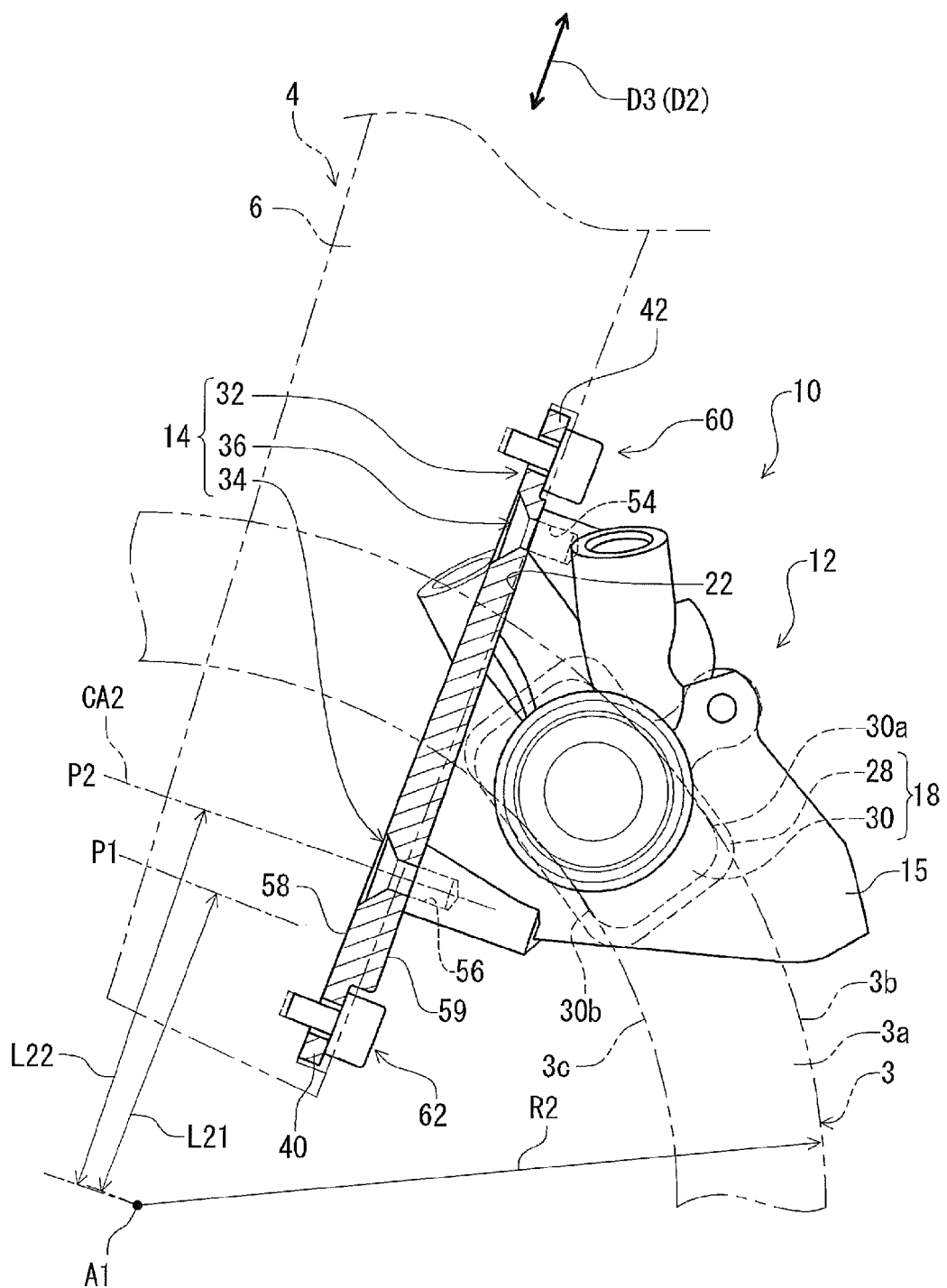
FIG. 10 is an elevational view of the bicycle brake caliper assembly illustrated in FIG. 8 (second position)

FIG. 9 is a side elevational view of the bicycle brake caliper assembly 10 in a state where the base member 32 is attached to the front fork 6 with the first orientation. FIG. 10 is a side elevational view of the bicycle brake caliper assembly 10 in a state where the base member 32 is attached to the front fork 6 with the second orientation. FIG. 9 corresponds to FIG. 5, and FIG. 10 corresponds to FIG. 8. In FIGS. 9 and 10, the base member 32 is illustrated as a cross-section.

As seen in FIGS. 9 and 10, the base structure 14 is configured to be coupled to the attachment surface 22 of the brake caliper 12 and to be attached to the bicycle frame 4 with the first base surface 58 so as to arrange the brake caliper 12 at one of a first position P1 (FIG. 9) and a second position P2 (FIG. 10) which is farther from the rotational axis A1 than the first position P1. The base member 32 is configured to be attached to the bicycle frame 4 with one of the first orientation (FIG. 9) which is to arrange the brake caliper 12 at the first position P1 and the second orientation (FIG. 10) which is to arrange the brake caliper 12 at the second position P2.

As seen in FIG. 9, in a state where the brake caliper 12 is disposed at the first position P1, the friction parts 30 of the brake pads 18 are fit to the brake disc rotor 2 having an outer radius R1. More specifically, the brake disc rotor 2 includes an annular friction part 2a. A radially outer edge 30a of the friction part 30 is substantially aligned with a radially outer edge 2b of the annular friction part 2a. A radially inner edge 30b of the friction part 30 is substantially aligned with a radially inner edge 2c of the annular friction part 2a. In the illustrated embodiment, the first and second positions P1 and P2 are defined on the basis of the second center axis CA2 of the second threaded hole 56, for example.

As seen in FIG. 10, in a state where the brake caliper 12 is disposed at the second position P2, the friction parts 30 of the brake pads 18 are fit to a brake disc rotor 3 having an outer radius R2 greater than the outer radius R1 of the brake disc rotor 2. More specifically, the brake disc rotor 3 includes an annular friction part 3a. The radially outer edge 30a of the friction part 30 is substantially aligned with a radially outer edge 3b of the annular friction part 3a. The radially inner edge 30b of the friction part 30 is substantially aligned with a radially inner edge 3c of the annular friction part 3a.

As seen in FIG. 9, a first distance L21 is defined between the rotational axis A1 of the brake disc rotor 2 and the second center axis CA2 of the second threaded hole 56 in the radial direction D3 in a state where the base member 32 is attached to the front fork 6 with the first orientation. As seen in FIG. 10, a second distance L22 is defined between the rotational axis A1 of the brake disc rotor 3 and the second center axis CA2 of the second threaded hole 56 in the radial direction D3 in a state where the base member 32 is attached to the front fork 6 with the second orientation. As seen in FIGS. 9 and 10, the second distance L22 corresponding to the second orientation is greater than the first distance L21 corresponding to the first orientation.

As described above, the bicycle brake caliper assembly 10 can be in two different states respectively corresponding to the brake disc rotors 2 and 3. The base member 32 is configured to be coupled to the brake caliper 12 and to be attached to the bicycle frame 4 (the front fork 6) such that relative position between the rotational axis A1 of the brake disc rotors 2 and 3 and the brake caliper 12 is adjustable in the radial direction D3 of the brake disc rotors 2 and 3.

More specifically, the base member 32 is configured such that the first position P1 of the coupling portion 48 in a state where the base member 32 is attached to the bicycle frame 4 with the first orientation differs from a second position P2 of the coupling portion 48 in a state where the base member 32 is attached to the bicycle frame 4 with the second orientation, in the radial direction D3. Accordingly, changing the orientation of the base member 32 relative to the front fork 6 and the brake caliper 12 allows the bicycle brake caliper assembly 10 to be adjusted to each of the brake disc rotors 2 and 3 having different outer radiuses R1 and R2.

With the bicycle brake caliper assembly 10, it is possible to adjust an inclination and/or an offset of the brake pad 18 relative to the brake disc rotor 2 or 3. The adjusting of the inclination and/or an offset of the brake pad 18 will be discussed below using a comparative example.

Figure 11:
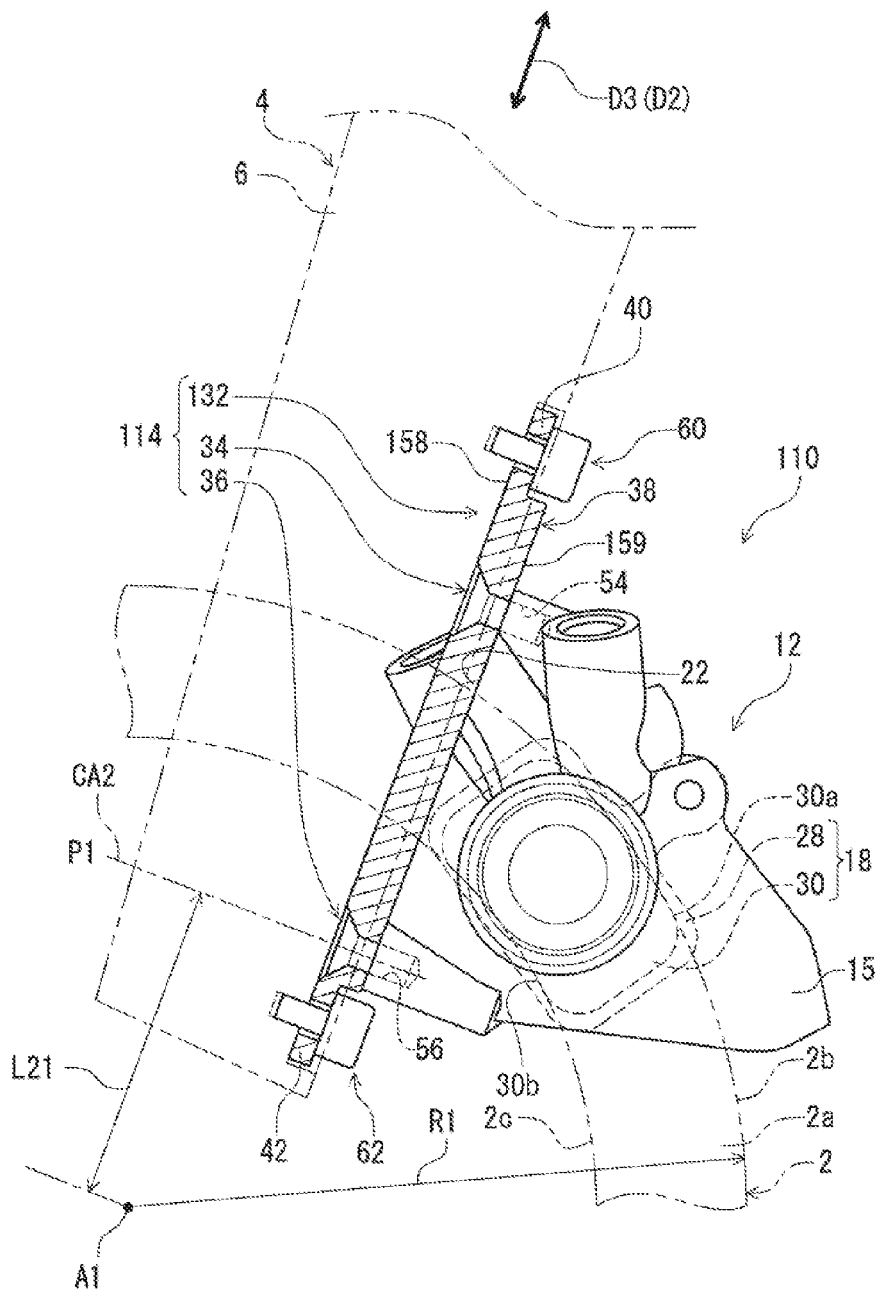
FIG. 11 is an elevational view of a bicycle brake caliper assembly in accordance with a comparative example (first position)
Figure 12:
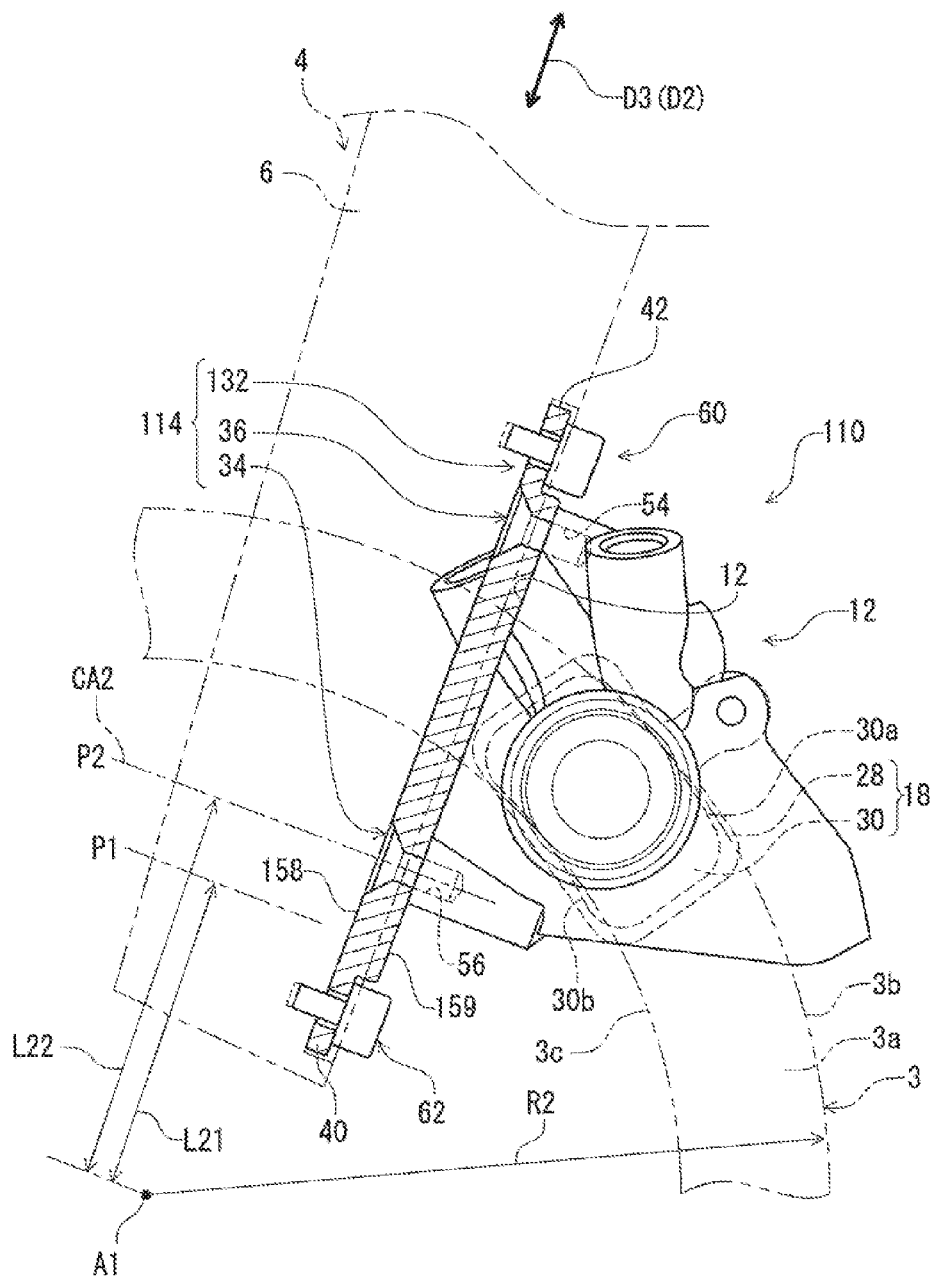
FIG. 12 is an elevational view of the bicycle brake caliper assembly in accordance with the comparative example (second position)

FIGS. 11 and 12 illustrate a bicycle brake caliper assembly 110 as the comparative example of the bicycle brake caliper assembly 10. In the bicycle brake caliper assembly 110, elements having substantially the same function as those in the first embodiment will be numbered the same here, and will not be described and/or illustrated again in detail here for the sake of brevity.

As seen in FIGS. 11 and 12, the bicycle brake caliper assembly 110 includes a base structure 114 having a base member 132. The base member 132 includes the first base surface 158 and a second base surface 159 parallel to the first base surface 158.

As seen in FIGS. 11 and 12, with the bicycle brake caliper assembly 110 in accordance with the comparative example, changing the orientation of the base member 132 relative to the front fork 6 and the brake caliper 12 allows the bicycle brake caliper assembly 110 to be adjusted to each of the brake disc rotors 2 and 3 having different outer radiuses R1 and R2. In a case where the second base surface 159 is parallel to the first base surface 158, a relative angle between the attachment surface 22 and the first base surface 158 is not changed between the first position P1 and the second position P2.

As seen in FIG. 12, however, changing the orientation of the base member 132 relative to the front fork 6 and the brake caliper 12 causes the brake pads 18 (more specifically, the friction parts 30) to be inclined and/or offset relative to the brake disc rotor 3. For example, the radially outer edge 30a and the radially inner edge 30b of the friction part 30 are inclined relative to the brake disc rotor 3 in a state where the base member 132 is coupled to the brake caliper 12 with the second orientation. In such a state, a part of the friction part 30 is not slidable with the brake disc rotor 3. This causes the brake pads 18 (the friction parts 30) and/or the brake disc rotor 3 to be partially worn, which shortens service life of the brake pads 18 and/or the brake disc rotor 3.

With the bicycle brake caliper assembly 10 in accordance with the first embodiment, as seen in FIGS. 9 and 10, the base structure 14 is configured such that a relative angle defined between the attachment surface 22 of the brake caliper 12 and the first base surface 58 of the base structure 14 differs between the first position P1 and the second position P2. This can reduce the inclination and/or the offset of the brake pads 18 relative to the brake disc rotor 3, which allows the service life of the brake pads 18 and/or the brake disc rotor 3 to be maintained regardless of the first and second positions P1 and P2.

Second Embodiment

A bicycle brake caliper assembly 210 in accordance with a second embodiment will be described below referring to FIGS. 13 to 16. The bicycle brake caliper assembly 210 has the same configuration as the bicycle brake caliper assembly 10 except for the base structure 14. Thus, elements having substantially the same function as those in the first embodiment will be numbered the same here, and will not be described and/or illustrated again in detail here for the sake of brevity.

Figure 13:
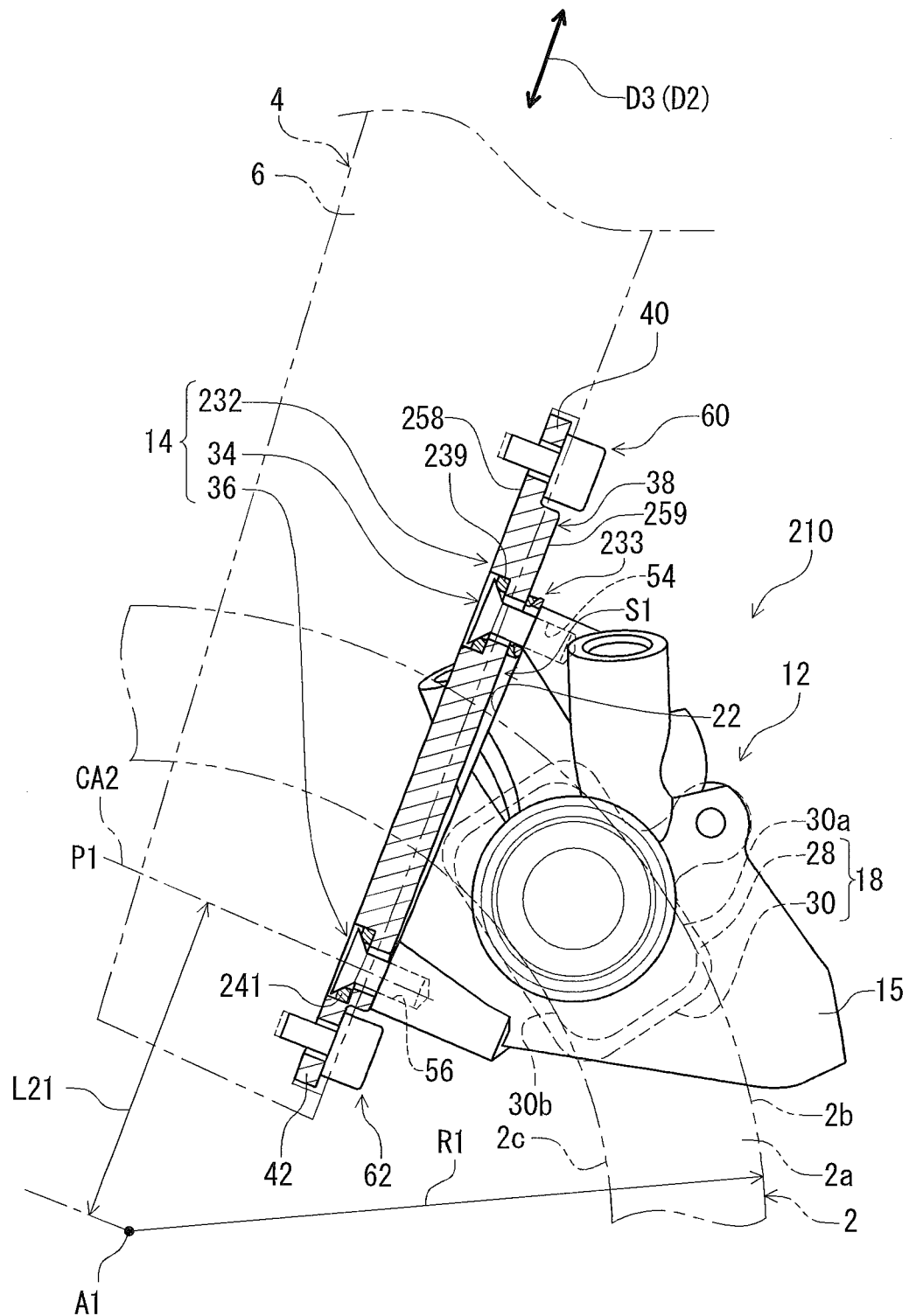
FIG. 13 is an elevational view of a bicycle brake caliper assembly in accordance with a second embodiment (first position)
Figure 14:
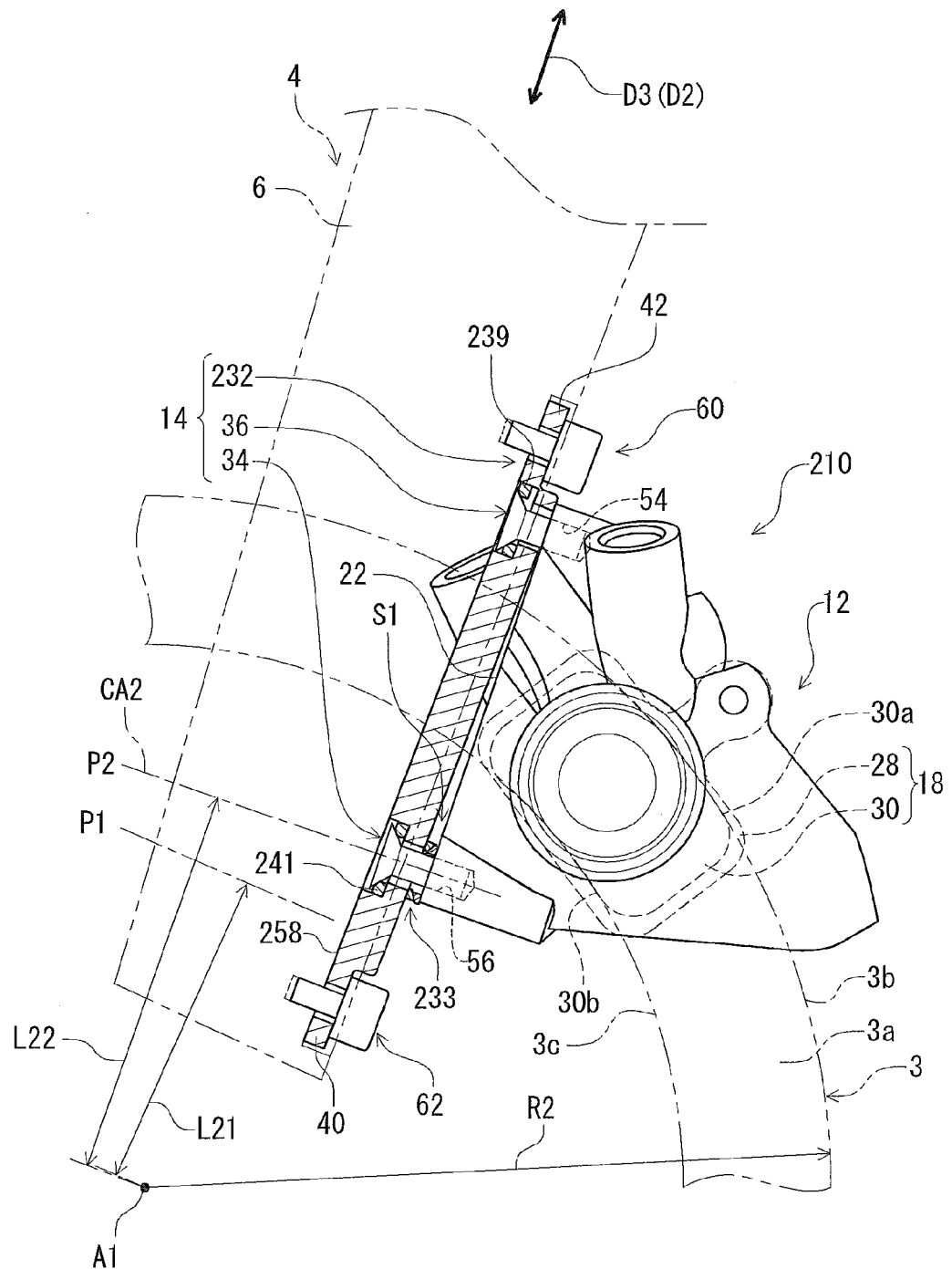
FIG. 14 is an elevational view of the bicycle brake caliper assembly in accordance with the second embodiment (second position)

As seen in FIGS. 13 and 14, the base structure 14 of the bicycle brake caliper assembly 210 includes a base member 232 and at least one spacer member. The base member 232 is configured to be coupled to the brake caliper 12. The base member 232 has the first base surface 258 and a second base surface 259 configured to face the attachment surface 22 on the brake caliper 12. In the illustrated embodiment, the second base surface 259 is parallel to the first base surface 258.

The at least one spacer member is configured to be disposed in at least one of a first space between the brake caliper 12 and the base member 232 and a second space between the base member 232 and the bicycle frame 4. In the illustrated embodiment, the base structure 14 includes a spacer member 233 configured to be disposed in a first space 51 between the brake caliper 12 and the base member 232. More specifically, the first space 51 is defined between the second base surface 259 and the attachment surface 22.

Figure 15:
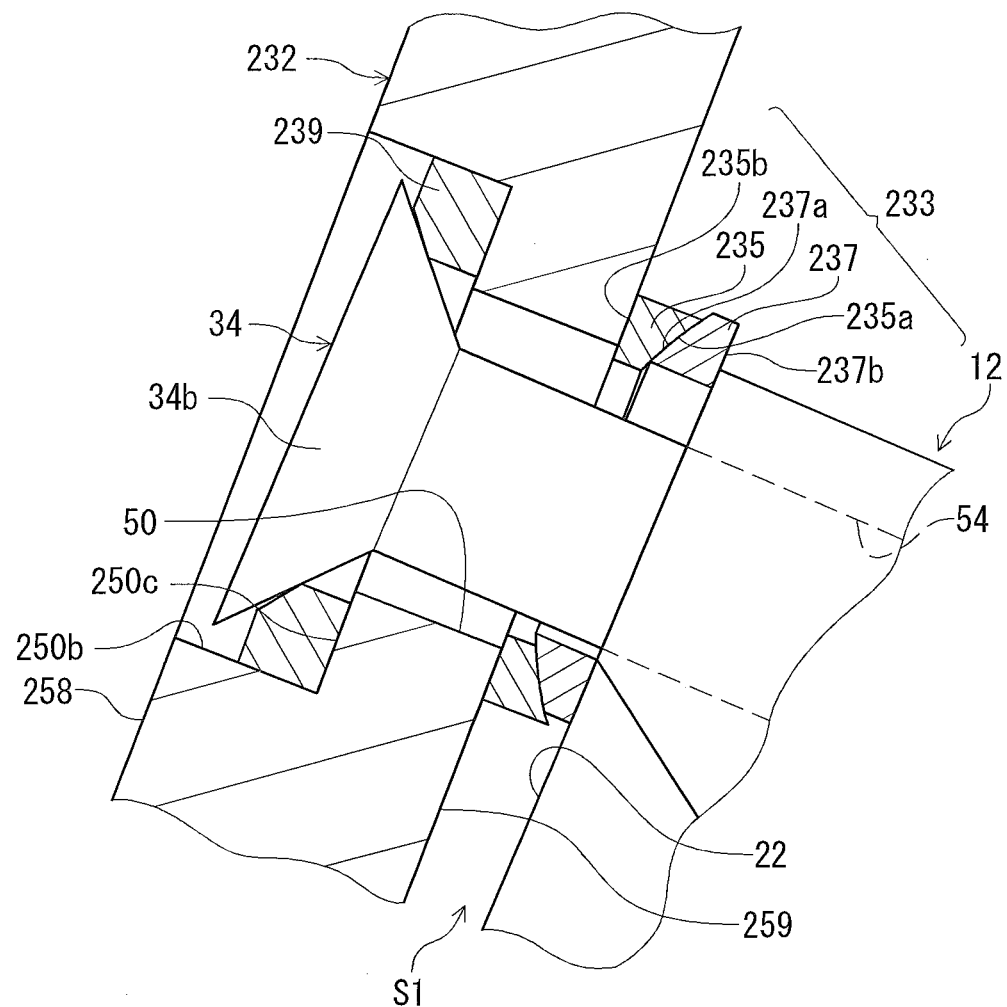
FIG. 15 is a partial enlarged view of the bicycle brake caliper assembly illustrated in FIG. 13.

FIG. 15 is a partial enlarged view of FIG. 13. As seen in FIG. 15, the spacer member 233 includes a first element 235 and a second element 237. In the illustrated embodiment, the first element 235 and the second element 237 have an annular shape. The first element 235 has a first spherical surface 235a. The second element 237 has a second spherical surface 237a contactable with the first spherical surface 235a. The first element 235 includes a first surface 235b configured to face the base member 232. The second element 237 includes a second surface 237b configured to face the brake caliper 12. In the illustrated embodiment, the first surface 235b is configured to contact the second base surface 259 of the base member 232. The second surface 237b is configured to contact the attachment surface 22 of the brake caliper 12.

The first spherical surface 235a and the second spherical surface 237a allows the first element 235 and the second element 237 to be rotated along the first spherical surface 235a and the second spherical surface 237a, allowing an orientation of the second surface 237b relative to the first surface 235b to be adjusted in accordance with a relative angle between the second base surface 259 and the attachment surface 22.

The first element 235 and the second element 237 can be integrally provided with each other as a single unitary member if needed and/or desired. In such an embodiment, the second surface 237b is inclined relative to the first surface 235b at a specific angle substantially equal to the relative angle between the second base surface 259 and the attachment surface 22, for example.

As seen in FIGS. 13 and 14, the bicycle brake caliper assembly 210 includes a first washer 239 and a second washer 241. For example, the first washer 239 and the second washer 241 are spring lock washers which are elastically deformable along a center axis thereof. Possible examples of the first washer 239 and the second washer 241 include a wave spring and a spring washer. The first washer 239 is disposed between the first countersunk head 34b and the base member 232. The second washer 241 is disposed between the second countersunk head 36b and the base member 232. The first washer 239 is elastically deformable between the first countersunk head 34b and the base member 232. The second washer 241 is elastically deformable between the second countersunk head 36b and the base member 232.

As seen in FIG. 15, the first through-hole 50 includes a larger-diameter hole 250b. The first washer 239 is provided in the larger-diameter hole 250b. The first through-hole 50 includes a first bottom surface 250c. The first washer 239 is provided between the first countersunk head 34b and the first bottom surface 250c. Misalignment between the first coupling member 34 and the first through-hole 50 can be absorbed by the first washer 239.

Figure 16:
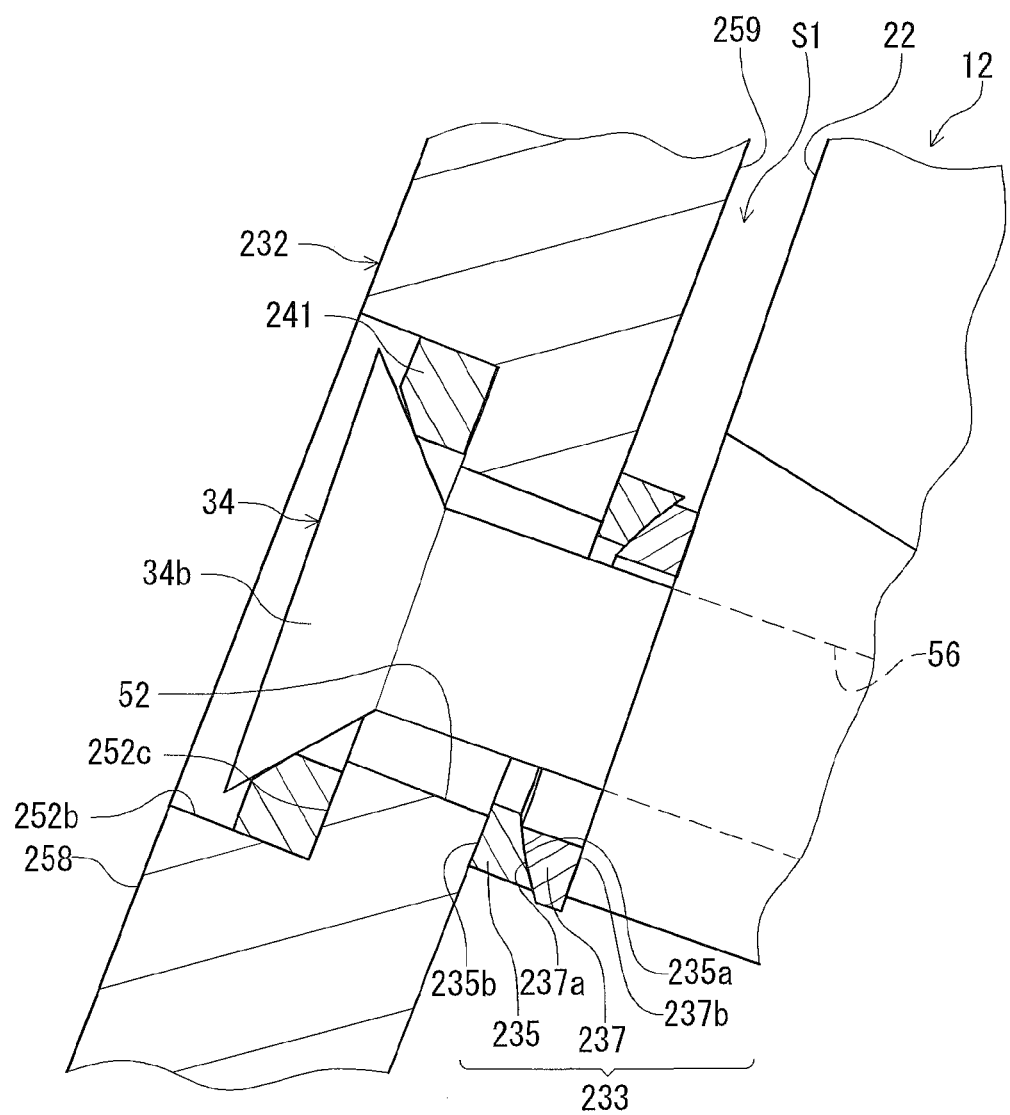
FIG. 16 is a partial enlarged view of the bicycle brake caliper assembly illustrated in FIG. 14.

FIG. 16 is a partial enlarged view of FIG. 14. As seen in FIG. 16, the second through-hole 52 includes a larger-diameter hole 252b. The second washer 241 is provided in the larger-diameter hole 252b. The second through-hole 52 includes a second bottom surface 252c. The second washer 241 is provided between the second countersunk head 36b and the second bottom surface 252c. Misalignment between the second coupling member 36 and the second through-hole 52 can be absorbed by the second washer 241.

As seen in FIGS. 13 and 14, the base structure 14 is configured to be coupled to the attachment surface 22 of the brake caliper 12 and to be attached to the bicycle frame 4 with the first base surface 258 so as to arrange the brake caliper 12 at one of the first position P1 (FIG. 13) and the second position P2 (FIG. 14) which is farther from the rotational axis A1 than the first position P1. The base member 232 is configured to be attached to the bicycle frame 4 with one of the first orientation (FIG. 13) which is to arrange the brake caliper 12 at the first position P1 and the second orientation (FIG. 14) which is to arrange the brake caliper 12 at the second position P2.

As seen in FIG. 13, the first coupling member 34 extends through the spacer member 233 in a state where the base member 232 is coupled to the brake caliper 12 with the first orientation. As seen in FIG. 14, the second coupling member 36 extends through the spacer member 233 in a state where the base member 232 is coupled to the brake caliper 12 with the second orientation.

As seen in FIGS. 13 and 14, the base structure 14 is configured such that a relative angle defined between the attachment surface 22 of the brake caliper 12 and the first base surface 258 of the base structure 14 differs between the first position P1 and the second position P2. This can reduce the inclination and/or the offset of the brake pads 18 relative to the brake disc rotor 3, which allows the service life of the brake pads 18 and/or the brake disc rotor 3 to be maintained regardless of the first and second positions P1 and P2.

In the illustrated embodiment, the spacer member 233 is configured to be disposed between the brake caliper 12 and the base member 232 in both the first orientation and the second orientation. However, the spacer member 233 can be omitted from the bicycle brake caliper assembly 210 in one of the first orientation and the second orientation if needed and/or desired. Furthermore, at least one spacer member 233 can be applied to the bicycle brake caliper assembly 210 if needed and/or desired. More specifically, another spacer member can be disposed in the first space 51 in addition to the spacer member 233. The spacer member 233 can be integrally provided as a single unitary member.

Third Embodiment

A bicycle brake caliper assembly 310 in accordance with a third embodiment will be described below referring to FIGS. 17 to 19. The bicycle brake caliper assembly 310 has the same configuration as the bicycle brake caliper assembly 10 except for the base structure 14. Thus, elements having substantially the same function as those in the above embodiments will be numbered the same here, and will not be described and/or illustrated again in detail here for the sake of brevity.

Figure 17:
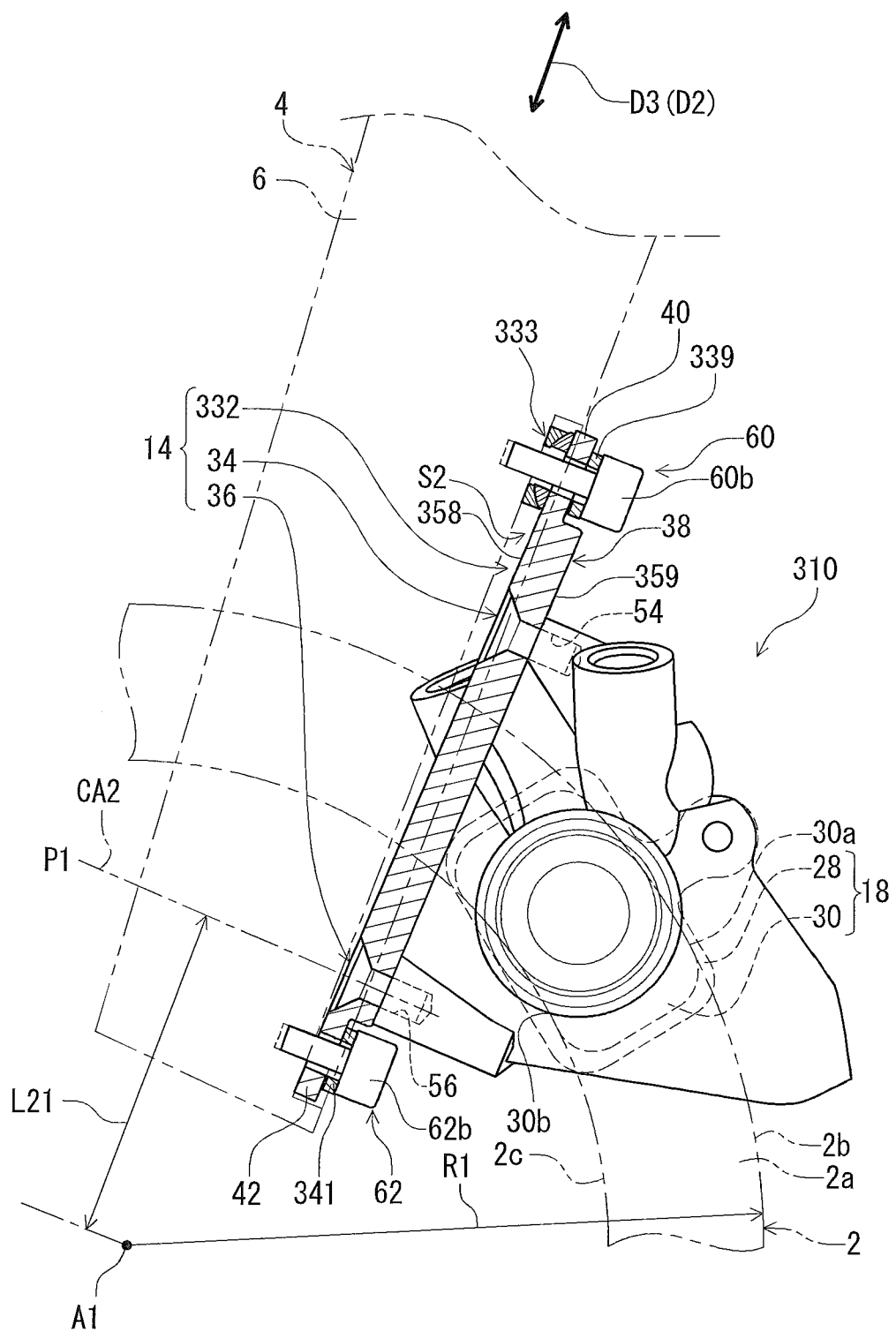
FIG. 17 is an elevational view of a bicycle brake caliper assembly in accordance with a third embodiment (first position)
Figure 18:
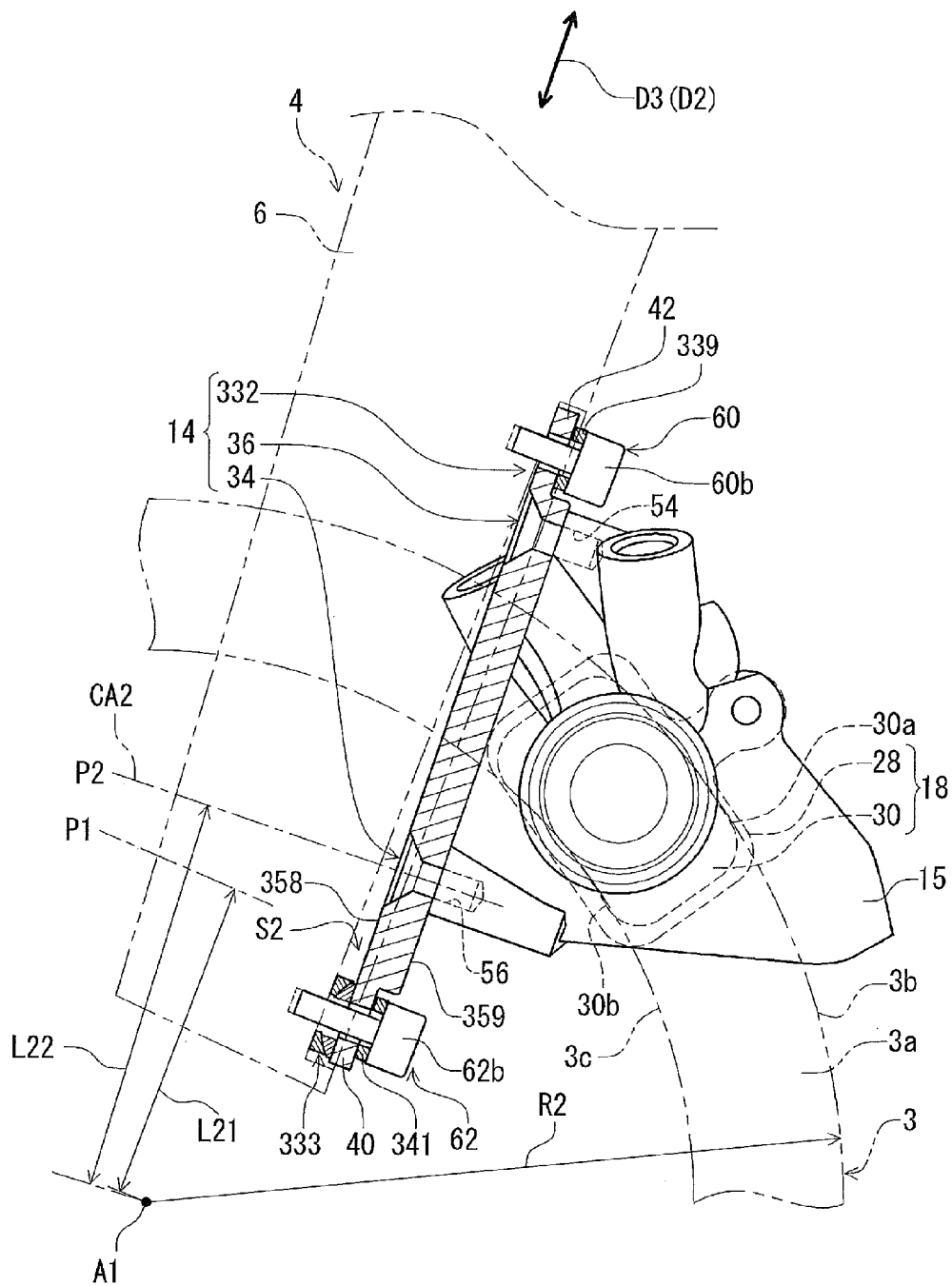
FIG. 18 is an elevational view of the bicycle brake caliper assembly in accordance with the third embodiment (second position)

As seen in FIGS. 17 and 18, the base structure 14 of the bicycle brake caliper assembly 310 includes a base member 332 and at least one spacer member. The base member 332 is configured to be coupled to the brake caliper 12. The base member 332 has the first base surface 358 and a second base surface 359 configured to face the attachment surface 22 on the brake caliper 12. In the illustrated embodiment, the second base surface 359 is parallel to the first base surface 358.

The at least one spacer member is configured to be disposed in at least one of a first space between the brake caliper 12 and the base member 332 and a second space between the base member 332 and the bicycle frame 4. In the illustrated embodiment, the base structure 14 includes a spacer member 333 configured to be disposed in a second space S2 between the base member 332 and the bicycle frame 4. More specifically, the second space S2 is defined between the first base surface 358 and the support surface 64a of the bicycle frame 4.

Figure 19:
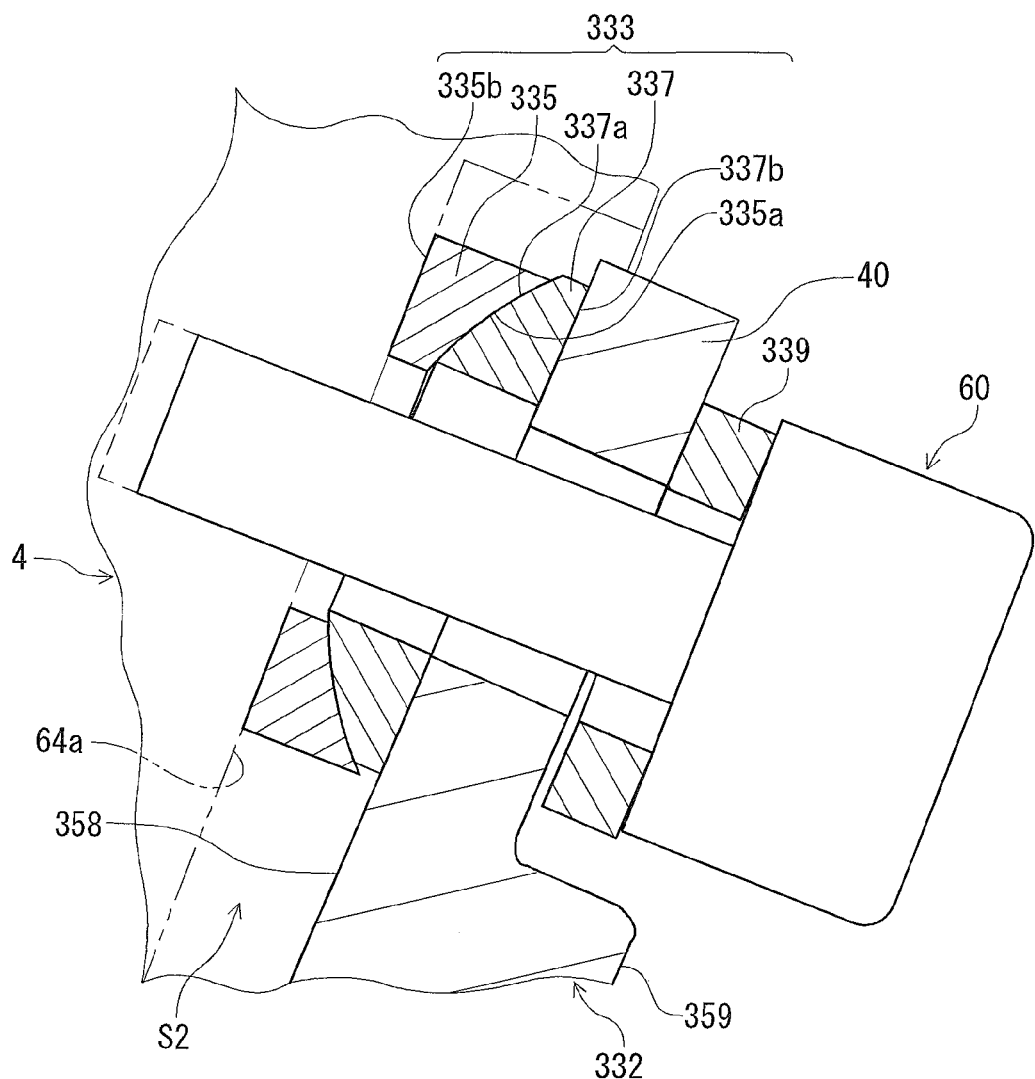
FIG. 19 is a partial enlarged view of the bicycle brake caliper assembly illustrated in FIG. 17.

FIG. 19 is a partial enlarged view of FIG. 17. As seen in FIG. 19, the spacer member 333 includes a first element 335 and a second element 337. In the illustrated embodiment, the first element 335 and the second element 337 have an annular shape. The first element 335 has a first spherical surface 335a. The second element 337 has a second spherical surface 337a contactable with the first spherical surface 335a. The first element 335 includes a first surface 335b configured to face the bicycle frame 4. The second element 337 includes a second surface 337b configured to face the base member 332. In the illustrated embodiment, the first surface 335b is configured to contact the support surface 64a of the bicycle frame 4. The second surface 337b is configured to contact the first base surface 358 of the base member 332.

The first spherical surface 335a and the second spherical surface 337a allows the first element 335 and the second element 337 to be rotated along the first spherical surface 335a and the second spherical surface 337a, allowing an orientation of the second surface 337b relative to the first surface 335b to be adjusted in accordance with a relative angle between the support surface 64a and the first base surface 358.

The first element 335 and the second element 337 can be integrally provided with each other as a single unitary member if needed and/or desired. In such an embodiment, the second surface 337b is inclined relative to the first surface 335b at a specific angle substantially equal to the relative angle between the support surface 64a and the first base surface 358, for example.

As seen in FIGS. 17 and 18, the bicycle brake caliper assembly 310 includes a first washer 339 and a second washer 341. For example, the first washer 339 and the second washer 341 are spring lock washers which are elastically deformable along a center axis thereof. Possible examples of the first washer 339 and the second washer 341 include a wave spring and a spring washer. The first washer 339 is disposed between the first hexagon socket head 60b and the base member 332. The second washer 341 is disposed between the second hexagon socket head 62b and the base member 332. The first washer 339 is elastically deformable between the first hexagon socket head 60b and the base member 332. The second washer 341 is elastically deformable between the second hexagon socket head 62b and the base member 332.

As seen in FIGS. 17 and 18, the base structure 14 is configured to be coupled to the attachment surface 22 of the brake caliper 12 and to be attached to the bicycle frame 4 with the first base surface 358 so as to arrange the brake caliper 12 at one of the first position P1 (FIG. 17) and the second position P2 (FIG. 18) which is farther from the rotational axis A1 than the first position P1. The base member 332 is configured to be attached to the bicycle frame 4 with one of the first orientation (FIG. 17) which is to arrange the brake caliper 12 at the first position P1 and the second orientation (FIG. 18) which is to arrange the brake caliper 12 at the second position P2.

As seen in FIG. 17, the first attaching member 60 extends through the spacer member 333 in a state where the base member 332 is coupled to the brake caliper 12 with the first orientation. As seen in FIG. 18, the second attaching member 62 extends through the spacer member 333 in a state where the base member 332 is coupled to the brake caliper 12 with the second orientation.

As seen in FIGS. 17 and 18, the base structure 14 is configured such that a relative angle defined between the attachment surface 22 of the brake caliper 12 and the first base surface 358 of the base structure 14 differs between the first position P1 and the second position P2. This can reduce inclination and/or offset of the brake pads 18 relative to the brake disc rotor 3, which allows the service life of the brake pads 18 and/or the brake disc rotor 3 to be maintained regardless of the first and second positions P1 and P2.

In the illustrated embodiment, the spacer member 333 is configured to be disposed between the base member 332 and the bicycle frame 4 in both the first orientation and the second orientation. However, the spacer member 333 can be omitted from the bicycle brake caliper assembly 310 in one of the first orientation and the second orientation if needed and/or desired. Furthermore, at least one spacer member 333 can be applied to the bicycle brake caliper assembly 310 if needed and/or desired. More specifically, another spacer member can be disposed in the second space S2 in addition to the spacer member 333. The spacer member 333 can be integrally provided as a single unitary member.

The constructions in accordance with the above embodiments can be at least partially combined if needed and/or desired. For example, at least one of the spacer member 233 and the spacer member 333 can be applied to the bicycle brake caliper assembly 10 in accordance with the first embodiment. Furthermore, in the second embodiment, the spacer member 333 in accordance with the third embodiment can be disposed between the bicycle frame 4 and the base member 232 if needed and/or desired.

In the present application, the term "attached" or "attaching", as used herein, encompasses configurations in which an element directly attached to another element by affixing the element is directly to the other element; configurations in which the element is indirectly attached to the other element via the intermediate member(s); and configurations in which one element is integral with another element, i.e. one element is essentially part of the other element. This concept also applies to words of similar meaning, for example, "joined", "connected", "coupled", "mounted", "bonded", "fixed" and their derivatives.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part" and "element" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle brake caliper assembly comprising:
   a brake caliper configured to apply a braking force on a brake disc rotor configured to be rotatable about a rotational axis, the brake caliper having an attachment surface; and
   a base structure having a first base surface, the base structure being configured to be coupled to the attachment surface of the brake caliper and to be attached to a bicycle frame so as to arrange the brake caliper at one of a first installed state at a first position and a second installed state at a second position, the second position being farther from the rotational axis than the first position, the base structure being configured such that a relative angle defined between the attachment surface of the brake caliper and the first base surface of the base structure differs between the first installed state and the second installed state.

2. The bicycle brake caliper assembly according to claim 1, wherein
   the base structure includes a base member configured to be attached to the bicycle frame with one of
      a first orientation which is to arrange the brake caliper at the first position, and
      a second orientation which is to arrange the brake caliper at the second position.

3. The bicycle brake caliper assembly according to claim 2, wherein
   the base member has the first base surface and a second base surface configured to face the attachment surface on the brake caliper, and
   the second base surface is inclined with respect to the first base surface.

4. The bicycle brake caliper assembly according to claim 3, wherein
   the second base surface is inclined with respect to the first base surface at an inclination angle between 1 degree and 3 degrees.

5. The bicycle brake caliper assembly according to claim 4, wherein
   the inclination angle is equal to 2 degrees.

6. The bicycle brake caliper assembly according to claim 1, wherein
   the base structure includes
      a base member configured to be coupled to the brake caliper, and
      at least one spacer member configured to be disposed in at least one of
         a first space between the brake caliper and the base member, and
         a second space between the base member and the bicycle frame.

7. The bicycle brake caliper assembly according to claim 6, wherein
   the base member has the first base surface and a second base surface configured to face the attachment surface on the brake caliper, and
   the second base surface is parallel to the first base surface.

8. The bicycle brake caliper assembly according to claim 7, wherein
   the spacer member includes
      a first element having a first spherical surface, and
      a second element having a second spherical surface contactable with the first spherical surface.

9. The bicycle brake caliper assembly according to claim 1, wherein
   the first base surface faces in a direction away from the attachment surface of the brake caliper when the base structure is coupled to the attachment surface of the brake caliper.

10. A bicycle brake caliper assembly comprising:
    a brake caliper configured to apply a braking force on a brake disc rotor configured to be rotatable about a rotational axis, the brake caliper having an attachment surface; and
    a base structure having a first base surface, the base structure being configured to be coupled to the attachment surface of the brake caliper and to be attached to a bicycle frame so as to arrange the brake caliper at one of a first position and a second position relative to the bicycle frame, the brake caliper arranged at the second position relative to the bicycle frame being farther from the rotational axis than the brake caliper arranged at the first position, the base structure being configured such that a relative angle defined between the attachment surface of the brake caliper and the first base surface of the base structure differs between a first state where the brake caliper is arranged at the first position and a second state where the brake caliper is arranged at the second position.

11. A bicycle brake caliper assembly comprising:
a brake caliper configured to apply a braking force on a brake disc rotor configured to be rotatable about a rotational axis, the brake caliper having an attachment surface; and
a base structure having a first base surface, the base structure being configured to be coupled to the attachment surface of the brake caliper and to be attached to a bicycle frame so as to arrange the brake caliper at one of a first position and a second position, the brake caliper arranged at the second position relative to the bicycle frame being farther from the rotational axis than the brake caliper arranged at the first position relative to the bicycle frame, the base structure being configured such that a relative angle defined between the attachment surface of the brake caliper and the first base surface of the base structure differs between a first state where the brake caliper is arranged at the first position and a second state where the brake caliper is arranged at the second position.

* * * * *